US009974058B2

(12) United States Patent
Määttanen et al.

(10) Patent No.: US 9,974,058 B2
(45) Date of Patent: May 15, 2018

(54) DEFINING A SUB-SUBFRAME OF A SUBFRAME

(71) Applicant: Telefonaktiebolaget LM Ericsson (publ), Stockholm (SE)

(72) Inventors: Helka-Liina Määttanen, Helsinki (FI); Mattias Andersson, Stockholm (SE); Niklas Andgart, Södra Sandby (SE); David Astely, Bromma (SE); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 15/034,053

(22) PCT Filed: Feb. 16, 2016

(86) PCT No.: PCT/EP2016/053263
§ 371 (c)(1),
(2) Date: May 3, 2016

(87) PCT Pub. No.: WO2016/142132
PCT Pub. Date: Sep. 15, 2016

(65) Prior Publication Data
US 2017/0105206 A1 Apr. 13, 2017

Related U.S. Application Data

(60) Provisional application No. 62/130,127, filed on Mar. 9, 2015, provisional application No. 62/130,200, filed
(Continued)

(51) Int. Cl.
*H04W 72/04* (2009.01)
(52) U.S. Cl.
CPC ..... *H04W 72/0406* (2013.01); *H04W 72/042* (2013.01); *H04W 72/0453* (2013.01)

(58) Field of Classification Search
CPC ......... H04W 72/0406; H04W 72/0453; H04W 72/042
See application file for complete search history.

(56) References Cited

U.S. PATENT DOCUMENTS

2015/0003351 A1* 1/2015 Park ................... H04J 1/02
370/329
2016/0226538 A1* 8/2016 Kim ...................... H04B 1/123

FOREIGN PATENT DOCUMENTS

WO 2006105005 A2 10/2006
WO 2014110467 A1 7/2014

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.8.0 (Mar. 2016), Mar. 2016, 1-95.
(Continued)

*Primary Examiner* — Omar J Ghowrwal
(74) *Attorney, Agent, or Firm* — Sage Patent Group

(57) ABSTRACT

Methods of operating a network node in a RAN may include transmitting control information for a subframe from the network node to a wireless terminal. The control information may include a Time Domain Split (TDS) indication defining a sub-subframe of the subframe, and a duration of the sub-subframe may be less than a duration of the subframe. Moreover, communication of data may be provided between the network node and the wireless terminal during the sub-subframe of the subframe. Methods of operating the wireless terminal may include receiving the control information for the subframe at the wireless terminal from the network node. The control information may include the TDS indication, and communication of the data may be provided between the wireless terminal and the network node during
(Continued)

the sub-subframe of the subframe. Related network nodes and wireless terminals are also discussed.

24 Claims, 5 Drawing Sheets

Related U.S. Application Data on Mar. 9, 2015, provisional application No. 62/130,312, filed on Mar. 9, 2015.

(56) References Cited

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.3.0, Dec. 2014, 1-89.

* cited by examiner

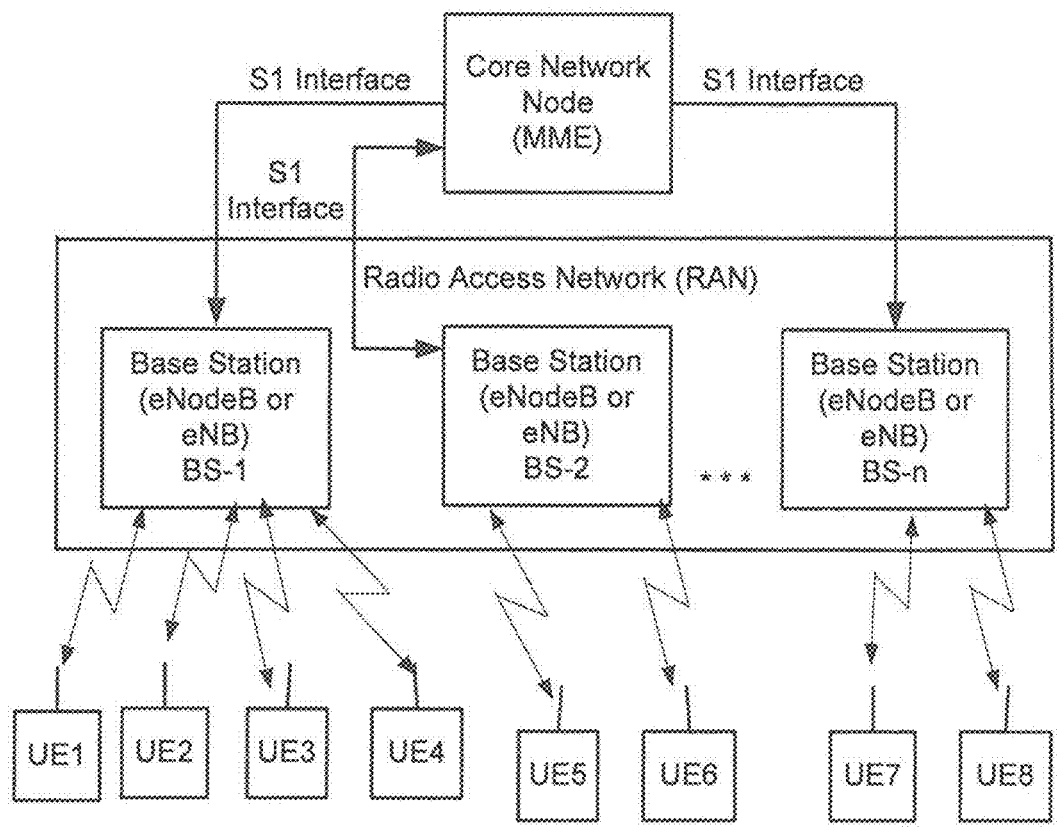
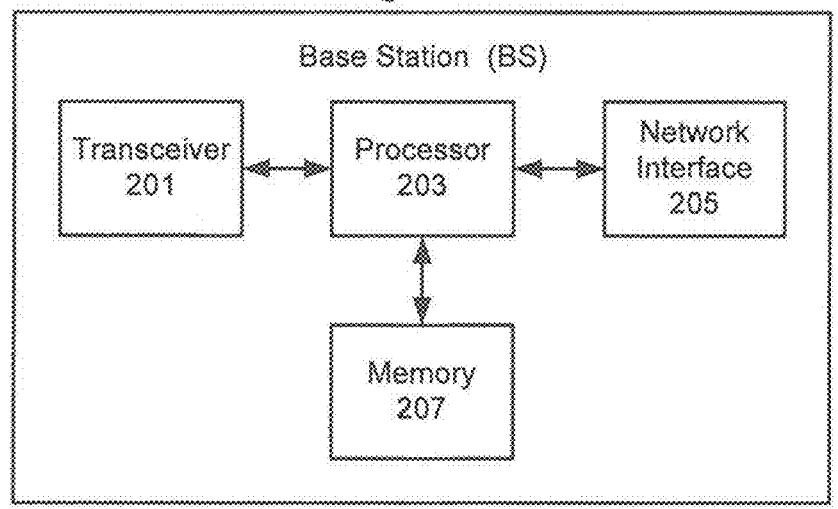

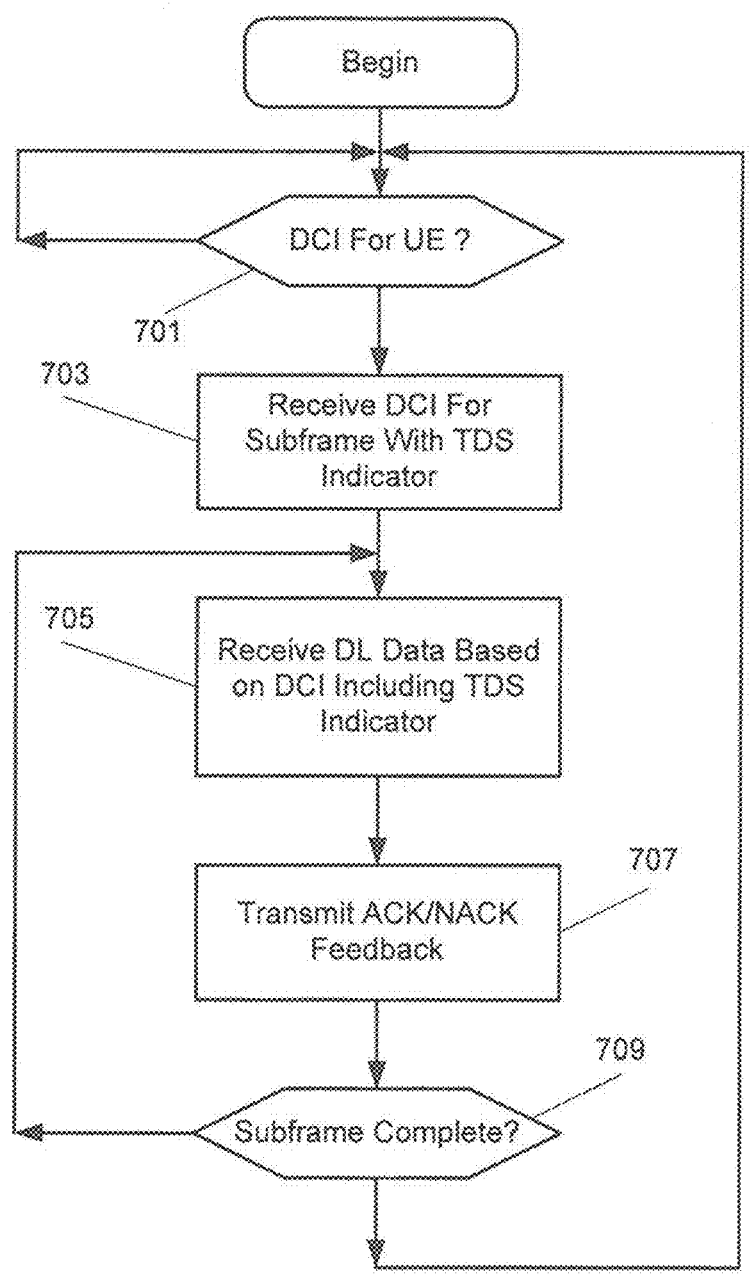

DEFINING A SUB-SUBFRAME OF A SUBFRAME

TECHNICAL FIELD

The present application relates to the field of communications, and more particularly to radio communications and related methods, network nodes, and wireless terminals.

BACKGROUND

Packet data latency is a performance metric that vendors, operators, and end-users regularly measure (e.g., via speed test applications). Latency measurements may be performed in all phases of a radio access network system lifetime, for example, when verifying a new software release or system component, when deploying a system, and/or when the system is in commercial operation.

Improved latency relative to previous generations of $3^{rd}$ Generation Partnership Project (3GPP) Radio Access Technologies (RATs) was a performance metric that guided the design of Long Term Evolution (LTE). LTE is also now recognized by end-users to be a system that provides faster access to the Internet and lower data latencies than previous generations of mobile radio technologies.

In current LTE standards, a downlink DL subframe may have a 1 millisecond (ms) duration with 14 symbols. Notwithstanding such systems, further improvement in data latency may still be desired.

SUMMARY

According to some embodiments of inventive concepts, a method of operating a network node in a radio access network may include transmitting control information for a subframe from the network node to a wireless terminal. The control information may include a Time Domain. Split indication defining a sub-subframe of the subframe, and a duration of the sub-subframe may be less than a duration of the subframe. Moreover, communication of data may be provided between the network node and the wireless terminal during the sub-subframe of the subframe.

According to other embodiments of inventive concepts, a network node of a wireless communication network may include a communication interface configured to provide communication with one or more wireless terminals over a radio interface, and a processor coupled with the communication interface. The processor may be configured to transmit control information for a subframe from the network node to a wireless terminal through the communication interface. The control information may include a Time Domain Split (TDS) indication defining a sub-subframe of the subframe, and a duration of the sub-subframe may be less than a duration of the subframe. The processor may also be configured to provide communication of data between the network node and the wireless terminal through the communication interface during the sub-subframe of the subframe.

According to some other embodiments of inventive concepts, a network node of a wireless communication network may be adapted to transmit control information for a subframe from the network node to a wireless terminal. The control information may include a Time Domain Split (TDS) indication defining a sub-subframe of the subframe, and a duration of the sub-subframe may be less than a duration of the subframe. The network node may also be adapted to provide communication of data between the network node and the wireless terminal during the sub-subframe of the subframe.

According to still other embodiments of inventive concepts, a network node of a wireless communication network may include a communication module configured to provide communication with one or more wireless terminals over a radio interface, and a processor module coupled with the communication module. The processor module may be configured to transmit control information for a subframe from the network node to a wireless terminal through the communication module. The control information may include a Time Domain Split (TDS) indication defining a sub-subframe of the subframe, and a duration of the sub-subframe may be less than a duration of the subframe. The processor module may be further configured to provide communication of data between the network node and the wireless terminal through the communication module during the sub-subframe of the subframe.

According to yet other embodiments of inventive concepts, a method of operating a wireless terminal in communication with a radio access network may include receiving control information for a subframe from the network node. The control information may include a Time Domain Split (TDS) indication defining a sub-subframe of the subframe, and a duration of the sub-subframe may be less than a duration of the subframe. In addition, communication of data may be provided between the wireless terminal and the network node during the sub-subframe the subframe.

According to more embodiments of inventive concepts, a wireless terminal may include a transceiver configured to provide radio communication with a wireless communication network over a radio interface, and a processor coupled with the transceiver. The processor may be configured to receive control information for a subframe from the network node through the transceiver. The control information may include Time Domain Split (TDS) indication defining a sub-subframe of the subframe, and a duration of the sub-subframe may be less than a duration of the subframe. The processor may also be configured to provide communication of data between the wireless terminal and the network node through the transceiver during the sub-subframe of the subframe.

According to still more embodiments of inventive concepts, a wireless terminal may be adapted to receive control information for a subframe from the network node. The control information may include a Time Domain Split (TDS) indication defining a sub-subframe of the subframe, and a duration of the sub-subframe may be less than a duration of the subframe. In addition, the wireless terminal may be adapted to provide communication of data between the wireless terminal and the network node during the sub-subframe of the subframe.

According to yet more embodiments of inventive concepts, a wireless terminal may include a communication module configured to provide radio communication with a wireless communication network over a radio interface, and a processor module coupled with the communication module. The processor module may be configured to receive control information for a subframe from the network node through the communication module. The control information may include a Time Domain Split (TDS) indication defining a sub-subframe of the subframe, and a duration of the sub-subframe may be less than a duration of the subframe. The processor module may also be configured to provide communication of data between the wireless terminal and the network node through the communication module during the sub-subframe of the subframe.

By using control information to define a sub-subframe of a subframe, time domain division of a subframe into sub-subframes may be enabled, and/or durations of downlink scheduling assignments for a wireless terminal may be changed dynamically from one subframe to the next.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 1 is a block diagram illustrating base stations of a Radio Access Network (RAN) in communication with wireless terminals and a core network node according to some embodiments of present inventive concepts;

FIG. 2 is a block diagram of a base station of FIG. 1 according to some embodiments of present inventive concepts;

FIG. 7 is a flow chart illustrating operations of a wireless terminal according to some embodiments of present inventive concepts.

DETAILED DESCRIPTION

Figure 3:
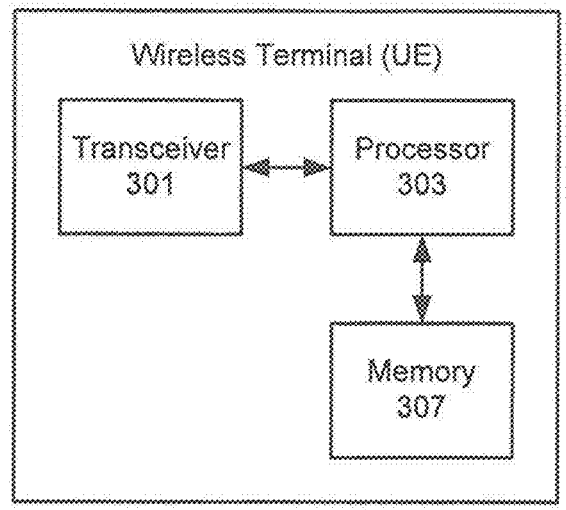
FIG. 3 is a block diagram illustrating a wireless terminal of FIG. 1 according to some embodiments of present inventive concepts.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN (Radio Access Network) that communicates over radio communication channels with wireless terminals (also referred to as UEs, user equipments, user equipment nodes, mobile terminals, wireless devices, etc.). It will be understood, however, that inventive concepts are not limited to such embodiments and may be embodied generally in any type of communication network. As used herein, a legacy or non-legacy wireless terminal (also referred to as u UE, user equipment, user equipment node, mobile terminal, wireless device, etc.) can include any device that receives data from and/or transmits data to a communication network, and may include, but is not limited to, a mobile telephone ("cellular" telephone), laptop/portable computer, pocket computer, hand-held computer, an M2M device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCUMA, WIMAX, UMB and GSM, may also benefit from exploiting ideas/concepts covered within this disclosure.

Also, note that terminology such as eNodeB (also referred to as abuse station, eNB, etc.) and UE (also referred to as user equipment, user equipment node, wireless terminal, mobile terminal, wireless device, etc.) should be considering non-limiting.

FIG. 1 is a block diagram illustrating a Radio Access Network (RAN) according to some embodiments of present inventive concepts. As shown, communications between base stations and one or more core network nodes (e.g., Mobility Management Entity MME or Service GPRS Support Node SGSN) may be provided using respective S1 interfaces. Each base station BS may communicate over a radio interface (including uplinks and downlinks) with respective wireless terminals UEs in a respective cell or cells supported by the base station. By way of example, base station BS-1 is shown in communication with wireless terminals UE1, UE2, UE4, and UE4, base station BS-2 is shown in communication with wireless terminals UE5 and UE6, and base station BS-n is shown in communication with wireless terminals UE7 and UE8.

FIG. 2 is a block diagram illustrating elements of a base station BS of FIG. 1. As shown, a base station BS may include a transceiver circuit 201 (also referred to as a transceiver or radio interface or a communication interface) configured to provide radio communications with a plurality of wireless terminals, a network interface circuit 205 (also referred to as a network interface configured to provide communications with other base stations of the RAN (e.g., over the) X2 interface), and a processor circuit 203 (also referred to as a processor) coupled to the transceiver circuit and the network interface circuit, and a memory circuit 207 coupled to the processor circuit. The memory circuit 207 may include computer readable program code that when executed by the processor circuit 203 causes the processor circuit to perform operations according to embodiments disclosed herein. According to other embodiments, processor circuit 203 may be defined to include memory so that a memory circuit is not separately provided.

FIG. 3 is a block diagram illustrating elements of a wireless terminal UE of FIG. 1. As shown, a wireless terminal UE may include a transceiver circuit 301 (also referred to as a transceiver) including a transmitter and a receiver configured to provide radio communications with a base station BS, a processor circuit 303 (also referred to as a processor) coupled to the transceiver circuit, and a memory circuit 307 coupled to the processor circuit. The memory circuit 307 may include computer readable program code that when executed by the processor circuit 303 causes the processor circuit to perform operations according to embodiments disclosed herein. According to other embodiments, processor circuit 303 may be defined to include memory so that a memory circuit is not separately provided.

Figure 4:
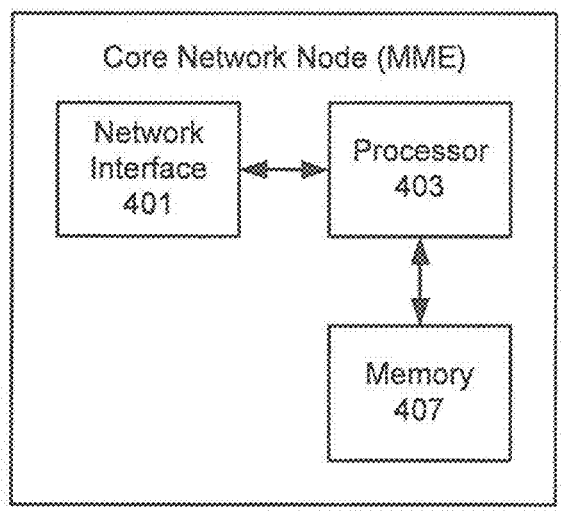
FIG. 4 is a block diagram illustrating a core network node of FIG. 1 according to some embodiments of present inventive concepts.

FIG. 4 is a block diagram illustrating elements of a core network node (e.g., an MME and/or an SGSN) of FIG. 1. As shown, a core network node may include a network interface circuit 401 (also referred to as a network interface or a communication interface configured to provide communications with base stations of the RAN (e.g., over the S1 interface, a processor circuit 403 (also referred to as a processor) coupled to the network interface circuit, and a memory circuit 407 coupled to the processor circuit. The memory circuit 407 may include computer readable program code that when executed by the processor circuit 403 causes the processor circuit to perform operations according to embodiments disclosed herein. According to other embodiments, processor circuit 403 may be defined to include memory so that a memory circuit is not separately provided.

According to some embodiments of inventive concepts, transmission time intervals (TTIs) may be shortened by introducing sub-subframes (SSFs). The shorter TTIs (provided using sub-subframes SSFs) can be decided to have any duration in time and may comprise resources on a number of OFDM symbols within a 1 ms subframe. As one example, the duration of an SSF may be 0.5 ms (e.g., seven OFDM symbols for a case with normal cyclic prefix). By assigning Physical Downlink Shared Channel (PDSCH) resources (used to transmit downlink data) within a sub-subframe (i.e., with shorter duration as compared to a full subframe), decoding latency can be reduced because the transmission ends earlier, and decoding can take less time assuming that the payload size is down scaled appropriately. This reduction in latency can further be used to reduce Hybrid Automatic Repeat-reQuest (HARQ) Round Trip Time (RTT) since ACK/NACK (Acknowledge/Negative-Acknowledge) feedback can be provided earlier from a downlink and UE side processing perspective. Hence, if the uplink (UL) also enables timely transmission of ACK/NACK feedback (from the UE to the base station), UE and network base station processing time related to, for example, HARQ retransmissions can be scaled with the same factor as the SSF compared with the 1 ms subframe currently used in LTE. Given the example of 0.5 ms SSFs, the HARQ RTT may be reduced to 4 ms (instead of 8 ms). However, embodiments of inventive concepts may be not be dependent on a reduction of the processing time and are not required to include any uplink aspects.

Existing physical layer downlink control channels, Physical Downlink Control Channel (PDCCH) and EPDCCH (Enhanced PDCCH), are transmitted once per 1 ms subframe.

Furthermore,
- A PDCCH is distributed over the whole carrier bandwidth, but is time multiplexed with PDSCH over the first 1-4 symbols in the subframe.
- An EPDCCH is distributed over the whole 1 ms subframe, but is frequency multiplexed with PDSCH and multiplexed onto one or multiple PRB pairs for localized and distributed transmission respectively.
- PDCCH has common search space where all UEs may need to detect common cell specific control information.
- Depending whether a wireless terminal UE has been configured for ePDCCH or not, the wireless terminal UE processor 303 searches UE specific control information from wireless terminal UE search space of ePDCCH or PDCCH, respectively.
- The exact DownLink DL data allocation is given in downlink control information (DCI) format which may have different options depending on, for example, a configured transmission mode.

When a wireless terminal UE is configured with a certain transmission mode, the wireless terminal will (in each subframe when it is not in discontinuous reception DRX) attempt PDCCH decoding of a finite number of DCI formats transmitted on the PDCCH (or EPDCCH) for a number of candidate PDCCH resource allocations (referred to as a search space). The DCI format has a CRC which is scrambled by a wireless terminal UE identifier (such as a C-RNTI), and when the CRC match after descrambling, a PDCCH with a certain DCI format has been detected.

Different DCI formats are distinguished by different payload sizes (i.e., number of bits in the DCI format). Hence, if we have multiple DCI formats of different sizes, a need for UE blind decoding may increase since each size requires a decoding attempt for each candidate PDCCH resource allocation.

There are currently a number of different DCI formats. See, 3GPP TS 36.212, V12.3.0 (2014-12) for DL resource assignments including format 1, 1A, 1B, 1C, 1D, 2, 2A, 2B, 2C and 2D.

Format 1: single codeword transmission:
- 1 bit to indicate resource allocation type (type 0 or type 1),
- $\lceil N_{RB}^{DL}/P \rceil$ bits to indicate the resource allocation (type 0 or type 1),
- 3 bits to indicate HARQ process number (4 bits for TDD),
- 3 bits to indicate new data indicator (NDI) and redundancy version (RV),
- 5 bits to indicate modulation and code scheme (MCS).

Format 1A, 1B, 1D:
- $\lceil \log_2(N_{RB}^{DL}(N_{RB}^{DL}+1)/2) \rceil$ bits to indicate the resource allocation (type 2),
- 3 bits to indicate HARQ process number (4hits for TDD),
- 3 bits to indicate new data indicator (NDI) and redundancy version (RV),
- 5 bits to indicate modulation and code scheme (MCS).

Format 2, 2A, 2B, 2C, 2D: two codeword transmission:
- $\lceil N_{RB}^{DL}/P \rceil$ bits to indicate the resource allocation (type 0 or type 1),
- 3 bits to indicate HARQ process number (4 bits for TDD),
- 2×3 bits to indicate new data indicator (NDI) and RV,
- 2×5 bits to indicate modulation and code scheme (MCS).

Here, P is the resource block group size which depends on the system bandwidth and $[N_{RB}^{DL}]$ is the number of resource block in the downlink.

As shown above, there are three different resource allocation types (Type 0, Type 1, and Type 2). For example, for Type 0, the system bandwidth is divided into resource block groups (RBGs) which consist of P PRB pairs, where P=1, 2,3,4 depending on total bandwidth. Then, there is one bitmap indicating whether something is scheduled in an RBG, and then a bitmap per RBG. The principle is same/similar for Type 1 and Type 2, and resources are allocated in frequency always assuming 1 ms length subframe.

The downlink control information (DCI) for a downlink scheduling assignment may thus include information on downlink data resource allocation in the frequency domain (the resource allocation), modulation and coding scheme (MCS), and HARQ process information. In case of carrier aggregation, information related to which carrier the PDSCH is transmitted on may be included as well.

There are also DCI formats for UL grants, DCI format 0, and DCI format 4 as well as for power control commands and DCI formats 3 and 3A.

According to some embodiments of inventive concepts, dynamic switching between different TTIs or scheduling assignment lengths (e.g., different sub-subframe lengths) may be provided.

One way to reduce latency may be to reduce the transmission time interval (TTI), and instead of assigning resources with a same time duration of 1 ms (i.e., always assigning a full subframe), resources may be assigned with shorter duration, such as a number of OFDM or SC-FDMA symbols. Accordingly, UE specific control signaling may enable indication of such shorter scheduling assignments (sub-subframes).

In addition, there may also be a need to be able to dynamically switch between different TTI durations, for example, between legacy 1 ms TTIs and shorter TTIs, not only to improve/optimize spectral efficiency (since shorter TTIs may incur higher overhead and/or worse demodulation performance), but also to be able to provide robust fallback signaling (e.g., for RRC signaling to reconfigure transmission modes).

Existing LTE operations (e.g., frame structure and control signaling, PDCCH and EPDCCH) may be are designed for fixed length 1 ms data allocations, which may vary only in allocated bandwidth. More particularly, current LTE downlink control information formats (DCIs) may define resource allocations within an entire subframe.

If existing control channels are used for shorter subframe control signaling, an option may be to use the PDCCH because the PDCCH region is always at the beginning of the 1 ms subframe. In this case, the ePDCCH may not be used because it spans an entire time duration of the subframe, and thus, the whole 1 ms ePDCCH may need to be decoded to get the scheduling assignment. Current LTE specifications may not provide dynamic reconfiguration of subframe duration to allow changing resource allocation durations from an entire subframe to part of a subframe between consecutive assigned downlink subframes. Moreover, current LTE specifications may not incorporate the time domain (within a subframe) in a resource allocation.

According to some embodiments of inventive concepts, a scheduler (e.g., implemented using processor 203) in each base station BS allocates resources to different wireless terminals for both UL and DL transmissions. DL scheduling assignments (as well as UL grants) are transmitted using appropriate Downlink Control Information (DCI) formats on the PDCCH every 1 ms, and intended wireless terminals UEs detect PDCCH transmissions and take appropriate actions.

The scheduler can base its decisions on radio conditions and/or traffic characteristics. For certain data packets intended for a certain wireless terminal UE, latency may be the higher priority, and for such packets, the scheduler may assign one or even multiple sub-subframes within a subframe. The receiving wireless terminal UP, can then process the received data packets more quickly, and provide earlier ACK/NACK feedback as compared to DL transmissions where the resource assignment has the full duration of a subframe, e.g., 1 ms. In general, there may be tradeoffs between efficiency, latency, and/or reliability, and for this purpose, sub-subframe durations may be dynamically selected on a 1 ms subframe basis.

In a same subframe the scheduler may perform a legacy 1 ms subframe resource assignment for one wireless terminal UE and a shorter sub-subframe assignment(s) for another wireless terminal UE, Based on the scheduler decisions, which may also include assigning an appropriate sub-subframe split for each UE, scheduling assignments may be transmitted to respective wireless terminals using a new DCI format as described below.

A new DCI format may thus be defined according to some embodiments of inventive concepts, possibly associated with a new transmission mode that may be configured for wireless terminals UEs capable of receiving short sub-subframes. Relative to existing DCI formats, new DCI formats disclosed herein may include a time domain split (TDS) indicator/field.

According to some embodiments, a wireless terminal UE may be assigned one sub-subframe within a subframe using the TDS field, wherein different TDS values for the TDS field may identify assignment of one sub-subframe (having a duration of less than the subframe), assignment of multiple sub-subframes (each having a duration of less than the subframe), and/or assignment of a complete subframe (like the legacy assignment of a whole 1 ms subframe).

According to some embodiments of inventive concepts, a wireless terminal UE could be assigned multiple sub-subframes within a subframe using the TDS. In such a case, the DCI format may be changed depending on the TDS so that fewer bits are available for frequency domain resource allocation while HARQ information (e.g., new data indicator or NDI) for multiple sub-subframes can be provided.

Using PDCCH, current downlink control procedures may be extended using time domain split indication/field. A wireless terminal UE can identify the new DCI format sent via legacy PDCCH because the start of the PDCCH at the beginning of each subframe is known, and use of the new DCI format via legacy PDCCH may be backward compatible because a legacy DCI format can still be sent via PDCCH and may be detected by legacy wireless terminals UEs. Because PDCCH is defined in the beginning of each subframe and consequently, a DCI may be transmitted only once for subframe, scheduling may be performed on a per-subframe basis.

When a wireless terminal UE is configured with a certain transmission mode according to some embodiments of inventive concepts, it may attempt to decode certain downlink control channel (DCI) formats sent via PDCCH. According to some embodiments, a wireless terminal UE may be configured in a certain transmission mode in which it tries to decode new DCI formats that can assign parts of subframes, so called sub-subframes. Three different types of such assignments may be provided as follows:

Legacy assignment where a resource assignment spans an entire 1 ms subframe;

Assignment of a single sub-subframe (e.g., a first or second sub-subframe in embodiments where each 1 ms subframe is divided into two sub-subframes; and Assignments of multiple sub-subframes within a same subframe (e.g., assignment of both sub-subframes in a subframes with separate ACK/NACK feedback for each sub-subframe).

According to some embodiments of inventive concepts, a DCI format may be extended to include a time domain split (TDS) indicator (in a TDS field) from which the wireless terminal UE processor 303 can determine in which OFDM/SC-CDMA symbols the wireless terminal UE has been assigned resources for data transmission/reception.

According to some embodiments discussed below, a single sub-subframe may be assigned for downlink data transmission to a wireless terminal UE.

The TDS indicator (in a TDS field of DCI) can take on several values. One TDS indicator (e.g., all zeros) can be used to indicate legacy operation where the entire 1 ms subframe is assigned for downlink transmission. Other TDS indicators may indicate assignment of respective sets of symbols in the subframe, where each set is less than the complete subframe and each set is configured by higher layers. For the case that a short sub-subframe with duration 0.5 ms is used, a 2-bit TDS indicator field may support four TDS indicators indicated below in Table 1.

TABLE 1

TDS Indicators used as Bitmaps with 2 Sub-Subframes

| TDS Indicator | Sub-subframe(s) assignment |
|---|---|
| 00 | Assign whole 1 ms subframe (symbols 1-14, less symbols used for PDCCH), with decoding for complete subframe and single ACK/NACK feedback for complete subframe |
| 10 | First 0.5 ms sub-subframe assigned (symbols 1-7 of subframe, less symbols used for PDCCH) |
| 01 | Second 0.5 ms sub-subframe assigned (symbols 8-14 of subframe) |

TABLE 1-continued

TDS Indicators used as Bitmaps with 2 Sub-Subframes

| TDS Indicator | Sub-subframe(s) assignment |
|---|---|
| 11 | $1^{st}$ & $2^{nd}$ 0.5 ms sub-subframes assigned (with separate decoding and separate ACK/NACK feedback for each sub-subframe) |

In the example of table 1, the second ("10"), third ("01"), and fourth ("11") TDS indicators may provide respective bitmaps indicating assignment of sub-subframes according to embodiments of inventive concepts, while the first ("00") TDS indicator indicates legacy operation where an entire 1 ms subframe is assigned for downlink transmission. When sub-subframes are assigned (e.g., based on TDS indicators 01, 10, and 11), each sub-subframe is separately decoded and separate ACK/NACK feedback is provided for each sub-subframe. Accordingly, with TDS indicator 11, wireless terminal UE processor 303 may separately decode the $1^{st}$ and $2^{nd}$ sub-subframes of the same subframe, and wireless terminal UE processor 303 may provide separate ACK/NACK feedback for the $1^{st}$ and $2^{nd}$ sub-subframes of the same subframe. In contrast, with TDS indicator 00, wireless terminal UE processor 303 may perform a single decoding for the entire subframe, and wireless terminal UE may provide a single ACK/NACK feedback for the entire subframe.

According to embodiments discussed above with respect to Table 1, a subframe may be divided into two sub-subframes. According to some other embodiments, a 14 symbol subframe may be divided into four sub-subframes, for example, a first sub-subframe including symbols 1-5 (less symbols used for PDCCH), a second sub-subframe including symbols 6-8, a third sub-subframe including symbols 9-11, and a fourth sub-subframe including symbols 12-14. TDS indicators for such assignments may be provided as illustrated in Table 2.

TABLE 2

TDS Indicators used as Bitmaps with Four Sub-Subframes

| TDS Indicator | Sub-subframe(s) Assignment |
|---|---|
| 0000 | Assign complete 1 ms subframe (symbols 1-14, less symbols used for PDCCH), with decoding for complete subframe and single ACK/NACK feedback for complete subframe |
| 1000 | $1^{st}$ sub-subframe assigned (symbols 1-5 of subframe, less symbols used for PDCCH) [(11111000000000)] |
| 0100 | $2^{nd}$ sub-subframe assigned (symbols 6-8 of subframe) [(00000111000000)] |
| 0010 | $3^{rd}$ sub-subframe assigned (symbols 9-11 of subframe) [(00000000111000)] |
| 0001 | $4^{th}$ sub-subframe assigned (symbols 2-14 of subframe) [(00000000000111)] |
| 1100 | $1^{st}$ & $2^{nd}$ sub-subframes assigned (symbols 1-8 of subframe, less symbols used for PDCCH) [(11111, 111, 000000)] with separate decoding and separate ACK/NACK feedback for $1^{st}$ and $2^{nd}$ SSFs |
| 0110 | $2^{nd}$ & $3^{rd}$ sub-subframes assigned (symbols 6-11 of subframe) [(00000, 111, 111, 000)] with separate decoding and separate ACK/NACK feedback for $2^{nd}$ and $3^{rd}$ SSFs |
| 0011 | $3^{rd}$ & $4^{th}$ sub-subframes assigned (symbols 9-14 of subframe) [(00000000, 111, 111)] with separate decoding and separate ACK/NACK feedback for $3^{rd}$ and $4^{th}$ SSFs |
| 1110 | $1^{st}$, $2^{nd}$, & $3^{rd}$ sub-subframes assigned (symbols 1-11 of subframe, less symbols used for PDCCH) [(11111, 111, 111, 000)] with separate decoding and separate ACK/NACK feedback for $1^{st}$, $2^{nd}$ and $3^{rd}$ SSFs |
| 0111 | $2^{nd}$, $3^{rd}$, & $4^{th}$ sub-subframes assigned (symbols 6-14 of subframe) [(00000, 111, 111, 111)] with separate decoding and separate ACK/NACK feedback for $2^{nd}$, $3^{rd}$, and $4^{th}$ SSFs |
| 1111 | $1^{st}$, $2^{nd}$, $3^{rd}$, and $4^{th}$ sub-subframes assigned (with separate decoding and separate ACK/NACK feedback for each sub-subframe) [(11111, 111, 111, 111)] with separate decoding and separate ACK/NACK feedback for $1^{st}$, $2^{nd}$, $3^{rd}$, and $4^{th}$ SSFs |

As shown in Table 2, a bitmap (having four bits) may be used to divide the subframe into four sub-subframes. In the embodiment of Table 2, for example, the TDS indicator [0100] means that the second sub-subframe (symbols 6-8 of the 14 symbol subframe) is assigned, and the value [0000] means legacy operation (symbols 1-14 are assigned). According to some embodiments, for TDS indictor values 1100, 0110, and 0011, wireless terminal UE processor 303 may separately decode the two indicated sub-subframes and may provide separate ACK/NACK feedback for the indicated sub-subframes, and for TDS indictors 1110 and 0111, wireless terminal UE processor 303 may separately decode the three indicated sub-subframes and may provide separate ACK/NACK feedback for the indicated sub-subframes. According to some other embodiments, for TDS indicator 1100, 0110, and 0011, wireless terminal UE processor 303 may combine both indicated sub-subframes for decoding with a single ACK/NACK feedback being provided for the indicated sub-subframes, and for TDS indicators 1110 and 0111, wireless terminal processor 303 may combine the three indicated sub-subframes for decoding with a single ACK/NACK feedback being provided for the indicated sub-subframes.

As shown in embodiments of Tables 1 and 2, each bit of a TDS indicator may refer directly to a sub-subframe, so that the number of sub-subframes within a subframe can be directly seen from the TDS field. In such "bitmap embodiments" a number of bits of the TDS indicator field is at least as large as a number of sub-subframes that are supported.

According to some other embodiments of inventive concepts, each TDS indicator (to be provided in a TDS indicator field) may be associated with a bitmap to cover all the symbols in the subframe (i.e., a bitmap including 14 bits for normal Cyclic Prefix or CP), with the bitmap configured by higher layers. In such embodiments, there could be a mapping between TDS indicators (provided as indices/identifiers instead of bitmaps) and assigned OFDM symbols as illustrated below in Table 3.

TABLE 3

TDS Indicators used to Identify Bitmaps

| TDS Indicator | Sub-Subframe(s) Assignment |
|---|---|
| 000 | Assign complete 1 ms (14 symbol) subframe ([11111111111111], less symbols used for PDCCH), with decoding for complete subframe and single ACK/NACK feedback for complete subframe |
| 001 | Assign first 7 symbol sub-subframe ([1111111, 0000000], less symbols used for PDCCH) |
| 010 | Assign first 7 symbol sub-subframe ([0000000, 1111111]) |
| 011 | Assign first 4 symbol sub-subframe ([00, 1111, 00000000]) |
| 100 | Assign second 4 symbol sub-subframe ([000000, 1111, 0000]) |
| 101 | Assign third 4 symbol sub-subframe ([0000000000, 1111]) |
| 110 | Assign $1^{st}$ and $2^{nd}$ 7 symbol sub-subframes ([1111111, 1111111]), with separate decoding and separate ACK/NACK feedback for each sub-subframe |
| 111 | Assign $1^{st}$, $2^{nd}$, and $3^{rd}$ four symbol sub-subframes (00, 1111, 1111, 1111), with separate decoding and separate ACK/NACK feedback for each sub-subframe |

The signaling option in Table 3 a lows dynamic reconfiguration between 1ms legacy Transmission Time intervals (TTIs) for a complete subframe (14 symbols less symbols used for PDCCH), 0.5 ms sub-subframe duration (about 7 symbols), and 0.33 ms sub-subframe duration (about 4 symbols). The TDS indicator field is part of the DCI format, and the bitmaps in the right column are configured by higher layers.

The wireless terminal UE processor 303 can then determine the time and frequency domain resources used for the downlink transmission by combining the resource allocation determined from the TDS indicator with the frequency domain resource allocation which can be of type 1.

According to some embodiments, further definition may be provided to define sub-subframe borders for a given assignment of symbols. For example, the TDS indicator of 111 in Table3 may indicate the assignment of all sub-subframes to a wireless terminal UE, but further definition may be useful to indicate that 4 symbols are included in each sub-subframe (e.g., (00,1111,1111,1111)).

According to some embodiments, there can be overlap of the PDCCH into symbols designated for a downlink PDSCH sub-subframe because PDCCH length may vary dynamically. For example, depending on PDCCH length, PDCCH may be provided in only the fist symbol of a subframe, in the first two symbols of a subframe, in the first three symbols of a subframe, or in the first four symbols of a subframe. Since resource assignment(s) is/are conveyed using PDCCH, the wireless terminal UE processor 303 can determine the PDCCH duration, and the wireless terminal UE processor 303 can assume, in the event of overlap between the resource allocation indicated by the TDS indicator and the PDCCH, that the resource allocation starts in the first symbol following the PDCCH.

According to some embodiments, multiple sub-subframes can be assigned to the wireless terminal UE within a same subframe. In this way, the wireless terminal UE processor 303 can decode the sub-subframes separately earlier, and provide earlier ACK/NACK feedback for the separate sub-subframes. For TDS indicators provided in Table 2, with four bit bitmaps, an example bitmap [1001] could allocate the first sub-subframe (symbols 1-5, less symbols used for PDCCH) and fourth sub-subframe (symbols 12-14) of that subframe to the UE, For TDS indicators provided in Table 1, an all 1 TDS indicator [11] could allocate both 7 symbol sub-subframes of the subframe to a single wireless terminal UE. Comparing the all zero TDS indicators ([00] or [0000]) and the all ones TDS indicators ([11] or [1111]) of Tables 1 and 2, the different sub-subframes are decoded separately with separate ACK/NACK reporting with the all ones TDS indicators, while legacy operation is performed with a single decoding and only one ACK/NACK report for the subframe with the all zeros TDS indicators.

According to some embodiments, Downlink Control information DCI may have TDS indicators/fields of varying size. Note that in this case, no extra bits are needed in the DCI to distinguish between different size TDS allocations. The largest TDS allocation may determine the size of the DCI (including the TDS, NM, and RV fields). The size of the DCI and TDS within the DCI would be known to the UE. It can be known by stating explicitly the size in the specification, or it is higher layer configured to the UE. If there is an option of having a 6-bit TDS table, thus there may be NDI and RV fields for the six sub-subframes. However, some bits of the NDI and RV fields may not have an NDI or RV meaning if there is no sub-subframe allocation for the associated bits, and those bits of the NDI, and RV fields (not associated with an allocated sub-subframe) may be set to zero. Consequently, the size of the TDS indicator can be indicated to the UE by mismatches in data allocation and the NDI field and/or the RV field. For example, if the $k^{th}$ bit of the TDS indicator is set to 0, indicating no data allocated to the UE, but the $k^{th}$ bit in the NDI is set to 1, this mismatch can signal to the UE that the size of the effective TDS indicator in that sub-subframe is k−1. For example, with k=4, in the entries indicated with double "**" below in Table 4, no data is allocated to the UE using the $4^{th}$ bit of the TDS indicator, but NDI for the $4^{th}$ bit is set to 1. Wireless terminal UE processor 303 can thus determine from this mismatch that a size of the effective TDS indicator in that sub--subframe is k−1, which is 3 in this example. Table 4 gives some examples for this implicit indication.

above, all zeros may be used to signal legacy operation where a complete subframe is assigned for downlink transmission to a wireless terminal UE, where wireless terminal processor 303 decodes all data symbols of the subframe in one decoding operation and where wireless terminal processor 303 generates one ACK/NACK response for decoding of all data symbols of the subframe. In this case, only one new data indicator bit x is used in the. DCI to indicate whether the data of the subframe is an initial transmission or a retransmission of the data. In Table 4, an "x" in the NDI

TABLE 4

TDS Indicators and NDIs used to Identify Bitmaps

| TDS Indicator | NDI | Sub-Subframe Assignment |
|---|---|---|
| 000000 | x00000 | Legacy-Assign full subframe (14 symbols, less symbols used for PDCCH), decode full subframe and provide single ACK/NACK Feedback |
| 100000 * | x00000 * | Assign $1^{st}$ two symbol sub-subframe ([00, 11, 0000000000]) |
| 010000 * | 0x0000 * | Assign $2^{nd}$ two symbol sub-subframe ([0000, 11, 00000000]) |
| 001000 * | 00x000 * | Assign $3^{rd}$ two symbol sub-subframe ([000000, 11, 000000]) |
| 000100 * | 000x00 * | Assign $4^{th}$ two symbol sub-subframe ([00000000, 11, 0000]) |
| 000010 * | 0000x0 * | Assign $5^{th}$ two symbol sub-subframe ([0000000000, 11, 00]) |
| 000001 * | 00000x * | Assign sixth 2 symbol sub-subframe ([000000000000, 11]) |
| 110000 * | xx0000 * | Assign $1^{st}$ & $2^{nd}$ two symbol sub-subframes, with separate decoding and separate ACK/NACK reporting ([00, 11, 11, 00000000]) |
| 001100 * | 00xx00 * | Assign $3^{rd}$ & $4^{th}$ two symbol sub-subframes, with separate decoding and separate ACK/NACK reporting ([0000, 11, 11, 000000]) |
| 00001 * | 0000xx * | Assign $5^{th}$ & $6^{th}$ two symbol sub-subframes, with separate decoding and separate ACK/NACK reporting ([0000, 11, 11, 000000]) |
| 111000 * | xxx000 * | Assign $1^{st}$, $2^{nd}$, & $3^{rd}$ two symbol sub-subframes, with separate decoding and separate ACK/NACK reporting ([00, 11, 11, 11, 000000]) |
| 000111 * | 000xxx * | Assign $4^{th}$, $5^{th}$, & $6^{th}$ two symbol sub-subframes, with separate decoding and separate ACK/NACK reporting ([00000000, 11, 11, 11]) |
| 111100 * | xxxx00 * | Assign $1^{st}$, $2^{nd}$, $3^{rd}$ & $4^{th}$ two symbol sub-subframes, with separate decoding and separate ACK/NACK reporting ([00, 11, 11, 11, 11, 0000]) |
| 001111 * | 00xxxx * | Assign $3^{rd}$, $4^{th}$, $5^{th}$ & $6^{th}$ two symbol sub-subframes, with separate decoding and separate ACK/NACK reporting ([000000, 11, 11, 11, 11]) |
| 111111 * | xxxxxx * | Assign $1^{st}$, $2^{nd}$, $3^{rd}$, $4^{th}$, $5^{th}$, and $6^{th}$ two symbol sub-subframes, with separate decoding and separate ACK/NACK reporting ([00, 11, 11, 11, 11, 11, 11]) |
| 100<u>0</u>00 ** | x00<u>1</u>00 ** | Assign $1^{st}$ four symbol sub-subframe ([00, 1111, 00000000]) |
| 010<u>0</u>00 ** | 0x0<u>1</u>00 ** | Assign $2^{nd}$ four symbol sub-subframe ([000000, 1111, 0000]) |
| 001<u>0</u>00 ** | 00x<u>1</u>00 | Assign $3^{rd}$ four symbol sub-subframes ([0000000000, 1111]) |
| 110<u>0</u>00 ** | xx0<u>1</u>00 ** | Assign $1^{st}$ & $2^{nd}$ four symbol sub-subframe, with separate decoding and separate ACK/NACK reporting ([00, 1111, 1111, 000]) |
| 011<u>0</u>00 * | 0xx<u>1</u>00 ** | Assign $2^{nd}$ & $3^{rd}$ four symbol sub-subframes, with separate decoding and separate ACK/NACK reporting ([000000, 1111, 1111]) |
| 111<u>0</u>00 ** | xxx<u>1</u>00 ** | Assign $1^{st}$, $2^{nd}$ & $3^{rd}$ four symbol sub-subframes, with separate decoding and separate ACK/NACK reporting ([00, 1111, 1111, 1111]) |
| 100<u>0</u>00 *** | x0<u>1</u>000 *** | Assign $1^{st}$ seven symbol sub-subframe, less symbols used for PDCCH ([1111111, 0000000]) |
| 010<u>0</u>00 *** | 0x<u>1</u>000 *** | Assign $2^{nd}$ seven symbol sub-subframe ([0000000, 11111111]) |
| 110<u>0</u>00 *** | xx<u>1</u>000 *** | Assign $1^{st}$ & $2^{nd}$ seven symbol sub-subframes, less symbols used for PDCCH ([1111111, 1111111]), with separate decoding and separate ACK/NACK reporting |

In the example of Table 4, a subframe includes 14 symbols, the first two of which are assumed to be used for PDCCH, leaving 12 symbols for possible assignment for downlink data transmission. Moreover, a six bit TDS field allows use of a six bit bitmap to define up to six sub-subframes of two symbols each. The first TDS indicator 000000 is all zeros, and like TDS indicators discussed indicates the bit can be a "0" (indicating an initial transmission) or a "1" (indicating a retransmission).

In Table 4, the $2^{nd}$ through $15^{th}$ TDS indicator entries (indicated with a single * "*") are used as six bit bitmaps to identify which of six two symbol sub-subframes are assigned for data transmission to the wireless terminal UE. Each assigned two symbol sub-subframe (indicated with a "1" in the TDS indicator) in a subframe is separately decoded by wireless terminal UE processor 303, and wireless terminal UE processor 303 provides a separate ACK/NACK response for each assigned two symbol sub-subframe. For these TDS indicators, there is no mismatch between the TDS indicators and the NDI indicators, meaning that NDI data (indicated by "x") is only provided in NDI indicator bits corresponding to sub-subframe assignments of TDS indicator bits, and all other NDI indicator bits are "0". In contrast, for the $16^{th}$ through $24^{th}$ TDS indicators of Table 4, there is a mismatch between corresponding bits of the TDS indicator and the Nat indicator (identified with underline in the mismatched bit of the NDI indicator).

In Table 4, the $16^{th}$ through $21^{st}$ TDS indicator entries (indicated with two *'s "**") are used as three bit bitmaps to identify which of three four symbol sub-subframes are assigned for data transmission to the wireless terminal UE. Each assigned four symbol sub-subframe (indicated with a "1" in the first/second/third bits of the TDS indicator) in a subframe is separately decoded by wireless terminal UE processor 303, and wireless terminal UE processor 303 provides a separate ACK/NACK response for each assigned four symbol sub-subframe. For these TDS indicators, there is a mismatch between the respective fourth bits of the TDS indicator and the NDI indicator (identified with underline). This mismatch allows wireless terminal UE processor 303 to identify the TDS indicator as a three bit bitmap for three 4 symbol sub-subframes.

In Table 4, the $22^{nd}$ through $24^{th}$ TDS indicator entries (indicated with three *'s "***") are used as two bit bitmaps to identify which of two seven symbol sub-subframes (less symbols used for PDCCH) are assigned for data transmission to the wireless terminal UE. Each assigned seven symbol sub-subframe (indicated with a "1" in the first/second bits of the TDS indicator) in a subframe is separately decoded by wireless terminal UE processor 303, and wireless terminal UE processor 303 provides a separate ACK/NACK response for each assigned seven symbol sub-subframe. For these TDS indicators, there is a mismatch between the respective third bits of the TDS indicator and the NDI indicator (identified with underline). This mismatch allows wireless terminal UE processor 303 to identify the TDS indicator as a two bit bitmap for two 7 symbol sub-subframes.

In the example of Table 4, the same TDS indicator may be used as a six bit bitmap for six two symbol sub-subframes, as a three bit bitmap for three four symbol sub-subframes, depending on a mismatch (or not) of a bit in the MDI and the placement of such a mismatched bit. The TDS indicator "100000" may be used to assign a $1^{st}$ two symbol sub-subframe when the NDI is "x00000", to assign a $1^{st}$ four symbol sub-subframe when the NDI is "x001000", or to assign a $1^{st}$ seven symbol sub-subframe when the NDI is "x01000". The TDS indicator "010000" may be used to assign a $2^{nd}$ two symbol sub-subframe when the NDI is "0x0000", to assign a $2^{nd}$ four symbol sub-subframe when the NDI is "0x01000", or to assign a seven symbol sub-subframe when the NDI is "0x1000". The TDS indicator "001000" may be used to assign a $3^{rd}$ two symbol sub-subframe when the NDI is "00x000", or to assign a $3^{rd}$ four symbol sub-subframe when the NDI is "00x1000". The TDS indicator "110000" may be used to assign $1^{st}$ and $2^{nd}$ two symbol sub-subframes when the NDI is "xx0000", to assign a $1^{st}$ and $2^{nd}$ four symbol sub-subframes when the NDI is "xx01000", or to assign $1_{st}$ and $2^{nd}$ seven symbol sub-subframes when the NDI is "xx1000". The TDS indicator "111000" may be used to assign $1^{st}$, $2^{nd}$, and $3^{rd}$ two symbol sub-subframes when the NDI is "xxx000", and/or to assign $1^{st}$, $2^{nd}$, and $3^{rd}$ four symbol sub-subframes when the NDI is "xxx100".

In an alternative, embodiments of Table 4 may be implemented using a sub-subframe index/identifier (instead of a bitmap) similar to the TDS indicators discussed above with respect to Table 3. For example, a five bit index/identification may be used for TDS indicators in Table 4, with values from 00000 for the first entry of Table 4 (to assign the full subframe) to 10111 for the $24^{th}$ (last) entry of Table 4 (to assign $1^{st}$ and $2^{nd}$ seven symbol sub-subframes). In such embodiments, assignment of indices/identifications to sub-subframe assignments may be configured by higher layers and known at both wireless terminal UE and base station, and analysis of TDS/NDI bit mismatches may be omitted.

Figure 5:
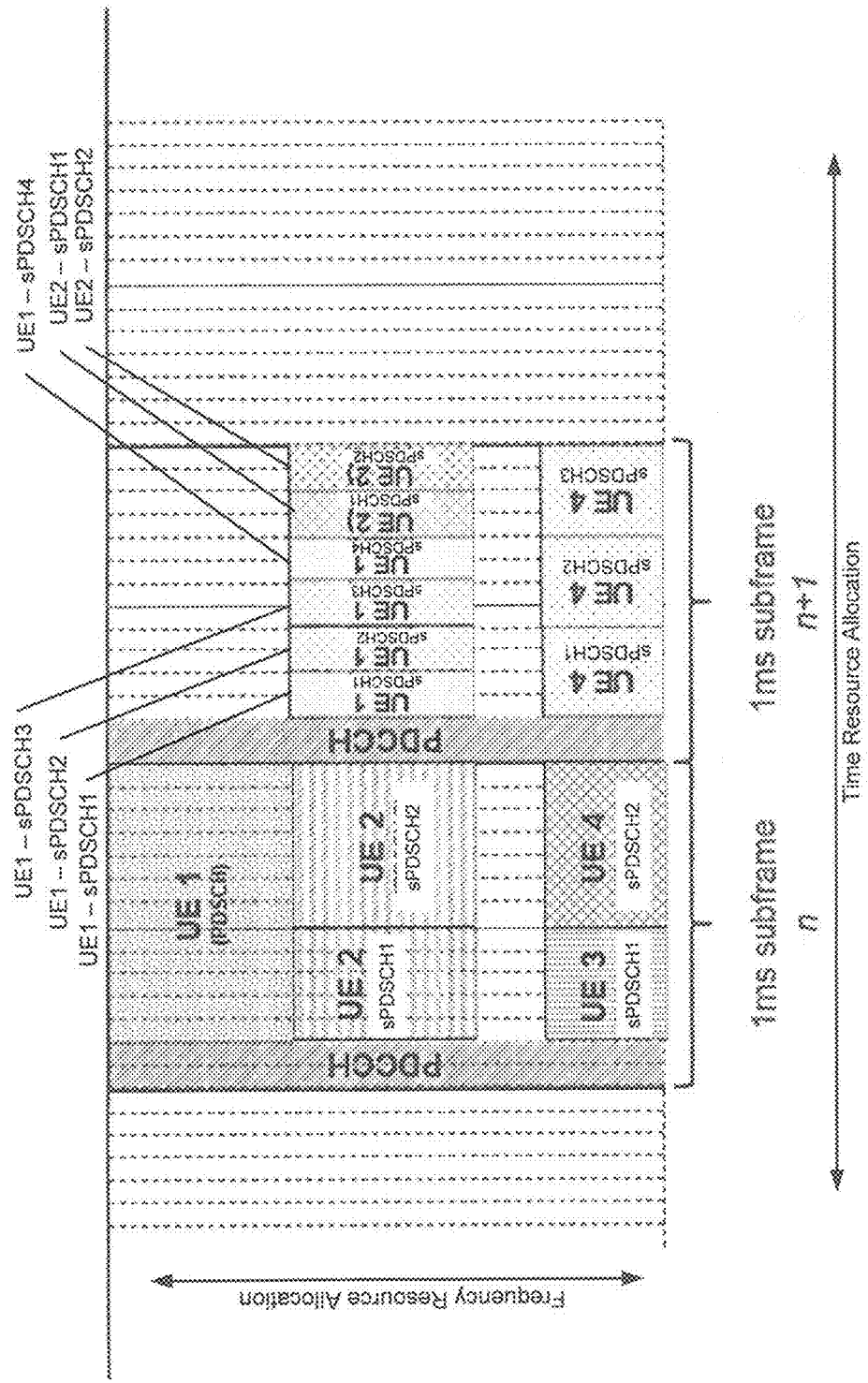
FIG. 5 is a time-frequency diagram illustrating examples of scheduling sub-subframes of a subframe according to some embodiments of present inventive concepts.

FIG. 5 illustrates examples of scheduling sub-subframes using embodiments DCI with TDS indicators/fields as discussed above with respect to Table 4. In subframe n, a first wireless terminal UE1 is scheduled with legacy DCI (without a TDS field), or with DCI including a TDS field with an all zero 000000 TDS indicator (e.g., the first entry of Table 4) and an NDI of x00000, so that the first wireless terminal UE1 is scheduled with symbols 1-14. In subframe n, a second wireless terminal UE2 is scheduled for two sub-subframes PDSCH1 (symbols 1-7, less symbols used for PDCCH) and PDSCH2 (symbols 8-14) using DCI including a TDS indicator of 110000 (e.g., the last entry of Table 4) and an NDI of xx1000. In subframe n, wireless terminal UE3 is scheduled with one seven symbol sub-subframe (symbols 1-7, less symbols used for PCDDH) using DCI including a TDS field with TDS indicator 100000 (e.g., the $22^{nd}$ entry of Table 4) and an NDI of x01000, and wireless terminal UE4 is scheduled with one seven symbol sub-subframe (symbols 8-14) using DCI including a TDS field with a TDS indicator 010000 (e.g., the $23^{nd}$ entry of Table 4) and an NDI of 0x1000. If indices/identifications (e.g., five bit indices/identifications from 00000 to 10111) are used as TDS indicators instead of the bitmaps of Table 4 in the example of FIG. 5, for subframe n, the DCI for wireless terminal UE1 may include a 00000 TDS indicator, the DCI for wireless terminal UE2 may include a 10111 TDS indicator, the DCI for wireless terminal UE3 may include a 10101 TDS indicator, and the DCI for wireless terminal UE4 may include a 10110 TDS indicator.

In subframe n+1, the first wireless terminal UE1 is scheduled for four two symbol sub-subframes PDSCH1 (symbols 3-4), PDSCH2 (symbols 5-6), PDSCH3 (symbols 7-8), and PDSCH4 (symbols 9-10) using DCI including a TDS indicator of 111100 (e.g., the $13^{th}$ entry of Table 4) and an NDI of xxxx00. subframe n+1, the second wireless terminal UE2 is scheduled for two two symbol sub-subframes PDSCH1 (symbols 11-12) and PDSCH2 (symbols 13-14) using DCI including a TDS indicator of 000011 (e.g., the $11^{th}$ entry of Table 4) and an NDI of 0000xx subframe n+1, the fourth wireless terminal UE4 is scheduled for three four symbol sub-subframes PDSCH1 (symbols 3-6), PDSCH2 (symbols 7-10), and PDSCH3 (symbols 11-14). If indices/identifications (e.g., five bit indices/identifications from 00000 to 10111) are used as TDS indicators instead of the bitmaps of Table 4 in the example of FIG. 5, for subframe n+1, the DCI for wireless terminal UE1 may include a 01100 TDS indicator, the DCI for wireless terminal UE2 may include a 01001 TDS indicator, and the DCI for wireless terminal UE4 may include a 10100 TDS indicator.

Examples of TDS indication values are discussed above by way of example with respect to Tables 1-4, but it will be understood that other TDS bitmaps, identifications, indices, codes, etc. may be used to identify different sub-subframe assignments. As discussed above with respect to Table 4, for example, a six bit ms field may be provided in DCI where bits of a six bit bitmap correspond to six two symbol sub-subframes, and with an NDI bit mismatch used to identify bitmaps of less than six bits where bits of a three bit bitmap correspond to three four symbol sub-subframes and bits of a two bit bitmap correspond to two seven symbol sub-subframes.

According to some embodiments of inventive concepts, multiple sub-subframes may share the frequency domain resource allocation, whereas HARQ related signaling (e.g., New data indicator NDI and Redundancy versions RV) may need to be determined separately for each sub-subframe. A Modulation and Coding Scheme (MCS) and parameters related to precoding could also be shared for all sub-subframes assigned to one wireless terminal UE.

According to some embodiments of inventive concepts, fields included in the DCI format may depend on the TDS in a similar way that resource allocation type can be dynamically changed with a bit in the DCI format. However, a difference may be that a size of another field may be reduced when a field/fields (e.g., a TDS field) is/are added so that a total size of the DCI remains the same. More particular, in some embodiments, a size of a frequency domain resource allocation may be reduced when more fields for HARQ related parameters (such as NDI and RV) are added. Assuming that the system has a bandwidth of 100 physical resource blocks corresponding to 25 bits of the DCI for the resource allocation, then, when two (2) or three (3) sub-subframes are assigned, the number of bits assigned for the frequency domain resource allocation may be reduced, for example, to 19 bits and 13 bits, respectively. One way to do this is to increase the Resource Block Group (RBC) size P (and fill unused bits with padding).

According to some embodiments of inventive concepts, a set of frequency domain allocations may be configured by higher layers, and the frequency domain index may be provided, to enable dynamic selection of one of the frequency domain resource allocations. According to other embodiments of inventive concepts, a HARQ process number could also be signaled separately for each sub-subframe. Moreover, padding may be used so that a size of the DCI is determined according to a signaling option that needs a largest number of bits. One example to have similar sized DCI is to use Type 1/0 Resource Allocation (RA) for the 1 ms allocation and a combination of Type 2 RA and time domain bitmap/index+possible NDI/RVI repetitions for sub-subframe allocations. Some padding can be used in case the sub-subframe DCI would result in a smaller bit size than the 1 ms allocation.

Resource allocation using DCI including defined TDS indication values may thus enables dynamically changing PDSCH assignment durations for a wireless terminal UE from one subframe to the next and/or may enable time domain division of the subframe into sub-subframes.

Figure 6:
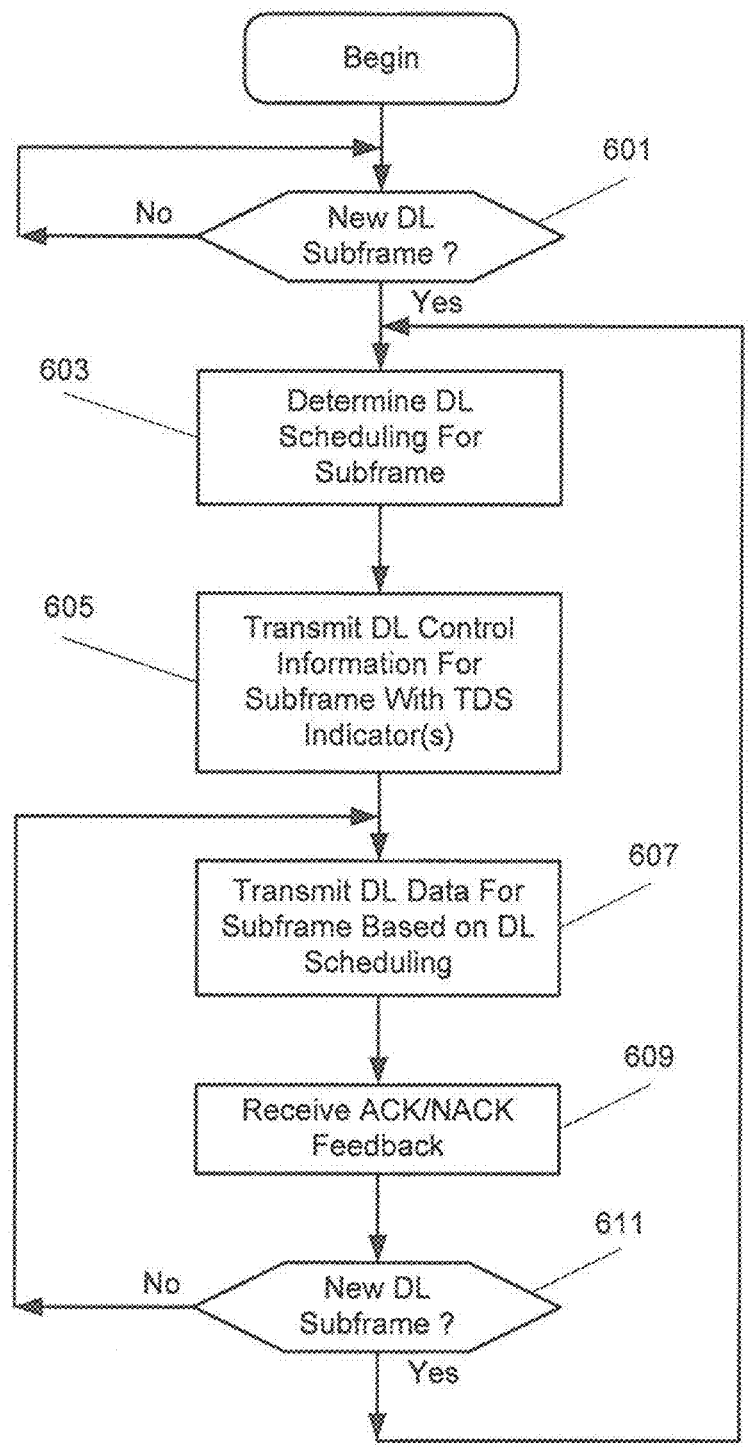
FIG. 6 is a flow chart illustrating operations of a base station according to some embodiments of present inventive concepts.

Operations of base station BS (e.g., base station BS-1 of FIG. 1) will now be discussed below with reference to the TDS/NDI indicators of Table 4, the scheduling examples of FIG. 5, and the flow chart of FIG. 6. At block 601 of FIG. 6, base station processor 203 may determine when it is time to schedule a first DL, subframe (e.g., subframe n FIG. 5), where a subframe may include 14 symbols provided over a 1 ms duration. At block 603, processor 203 may determine downlink scheduling for the new subframe. Referring by way of example to subframe n of FIG. 5 as a first subframe, DL data transmission may be scheduled for wireless terminal UE1 over the full subframe (less symbols used to transmit DCI using PDCCH) using first frequency resource, DL transmission may be scheduled for wireless terminal UE2 over two sub-subframes using a second frequency resource, DL transmission may be scheduled for wireless terminal UE3 over one sub-subframe using a third frequency resource, and DL transmission may be scheduled for wireless terminal UE4 over one sub-subframe (after the sub-subframe for UE3) using the third frequency resource.

At block 605, base station processor 203 may transmit DCI for subframe n through transceiver 201 to each of wireless terminals UE1, UE2, UE3, and UE4 using a downlink control channel (e.g., PDCCH, sPDCCH, etc.) at the beginning of subframe n. As discussed above, the DCI for each wireless terminal may include MCS information, PCI information, a TDS indication, NDI information, RV information, etc. Using the TDS indications of Table 4 by way of example, base station processor 203 may use the following TDS/NDI indications in DCI for the respective wireless terminals: the first entry of Table 4 (TDS=000000, NDI=x00000) for DCI to be transmitted to wireless terminal UE1 the $24^{th}$ entry of Table 4 (TDS=110000. NDI=xx1000) for DCI to be transmitted to wireless terminal UE2; the $22^{nd}$ entry of Table 4 (TDS=100000, NDI=x01.000) for DCI to be transmitted to wireless terminal UE3; and the $23^{rd}$ entry of Table 4 (TDS=010000, NDI=0x1000) for DCI to be transmitted to wireless terminal UE4.

Once the base station has transmitted DCI for subframe n to the respective wireless terminals UE1, UE2, UE3, and UE4 at block 605, base station processor 203 may transmit downlink data to each of the wireless terminals UE1, UE2, UE3, and UE4 using the assigned sub-subframes over a downlink shared channel(s) (e.g., using PDSCH) at block 607 and receive ACK/NACK feedback at block 609 until subframe n is complete at block 611. While not explicitly shown in FIG. 6, ACK/NACK feedback for subframe n may be received after termination of subframe n.

As shown in subframe n of FIG. 5, the ms indication for wireless terminal UE1 assigns all 14 symbols of subframe n (less symbols used for the downlink control channel) for downlink transmission of data using a first frequency resource. At block 607, processor 203 transmits the downlink data through transceiver 201 using 12 symbols of subframe n remaining after PDCCH, and at block 609, processor 203 may receive. ACK/NACK feedback from wireless terminal UE1 corresponding to the downlink data. Because the transmission to wireless terminal UE1 does not end until the end of subframe n, the ACK/NACK feedback may be received after completion of subframe n.

As shown in sublimate a of FIG. 5, the TDS indication for wireless terminal UE2 assigns all 14 symbols of subframe n (less symbols used for the downlink control channel) for downlink transmission of data using two sequential sub-subframes (identified as PDSCH1 and PDSCH2) both on a second frequency resource. At block 607, processor 203 transmits first downlink data through transceiver 201 using the first 5 symbols of subframe n after PDCCH using the second frequency resource, and processor 203 then transmits second downlink data through transceiver 201 using the last seven symbols of subframe n also using the second frequency resource. At block 609, processor 203 may receive first ACK/NACK feedback from wireless terminal UE2 for the first data transmitted during the first sub-subframe, and processor 203 may receive second ACK/NACK feedback from wireless terminal UE1 for the second data transmitted during the second sub-subframe. Because the first sub-subframe is complete before the second sub-subframe, the first ACK/NACK feedback may be received before the second ACK/NACK feedback. According to other embodiments, the first and second ACK/NACK feedback may be received together.

As shown in subframe n of FIG. 5, the ms indication for wireless terminal UE3 assigns the first 7 symbols of subframe n (less symbols used for the downlink control channel) for downlink transmission of data using a sub-subframe (identified as PDSCH1) on a third frequency resource. At block 607, processor 203 transmits downlink data through transceiver 201 using the first 5 symbols of subframe n after PDCCH using the third frequency resource. At block 609, processor 203 may receive ACK/NACK feedback from wireless terminal UE3 for the data transmitted during the assigned sub-subframe. Because the sub-subframe is complete before the end of the subframe, the ACK/NACK feedback may be received from wireless terminal UE3 before ACK/NACK feedback from other wireless terminals receiving downlink data over later ending sub-subframes of subframe n.

As shown in subframe n of FIG. 5, the TDS indication for wireless terminal UE4 assigns the last 7 symbols of subframe n for downlink transmission of data using a sub-subframe (identified as PDSCH2) on the third frequency resource. At block 607, processor 203 transmits downlink data through transceiver 201 using the last 7 symbols of subframe n after PDCCH using the third frequency resource. At block 609, processor 203 may receive ACK/NACK feedback from wireless terminal UE4 for the data transmitted during the assigned sub-subframe, Because the sub-subframe is not complete before the end of the subframe, th ACK/NACK feedback may be received after completion of subframe n. In subframe n, wireless terminals UE3 and UE4 are thus assigned different downlink sub-subframes (occupying different time resources) using a same frequency resource. Moreover, ACK/NACK feedback from wireless terminal UE3 may be received before ACK/NACK feedback from wireless terminal UE4.

Once subframe n is complete at block 611, processing for a next subframe n+1 may be performed. As discussed above, some ACK/NACK feedback for downlink data transmitted during subframe n may be received after completion of subframe n.

At block 603, processor 203 may determine downlink scheduling for subframe n+1. Referring by way of example to subframe n+1. of FIG. 5 as a second subframe, DL data transmission may be scheduled for wireless terminal UE1 over four 2 symbol sub-subframes using the second frequency resource, DL transmission may be scheduled for wireless terminal UE2 over two 2 symbol sub-subframes using the second frequency resource, and DL transmission may be scheduled for wireless terminal UE4 over three 4 symbol sub-subframes using the third frequency resource. While not explicitly shown in FIG. 6, some scheduling of block 603 may be performed before the start of subframe n+1 (e.g., before completion of subframe n.

At block 605, base station processor 203 may transmit DCI for subframe n+1 through transceiver 201 to each of wireless terminals UE1, UE2, and UE4 using a downlink control channel (e.g., PDCCH, sPDCCH, etc.) at the beginning of subframe n+1. As discussed above, the DCI for each wireless terminal may include MCS information, PCI information, a TDS indication, NDI information, RV information, etc. Using the TDS indications of Table 4 by way of example, base station processor 203 may use the following TDS/NDI indications in DCI for the respective wireless terminals: the 13$^{th}$ entry of Table 4 (TDS=111100, NDI=xxxx00) for DCI to be transmitted to wireless terminal UE1; the 10$^{th}$ entry of Table 4 (TDS=000011, NDI=0000xx) for DCI to be transmitted to wireless terminal UE2; and the UE2; entry of Table 4 (TDS=011000, NDI=xxx100) for DCI to be transmitted to wireless terminal UE4.

Once the base station has transmitted DCI for subframe n+1 to the respective wireless terminals UE1, UE2, and UE4 at block 605, base station processor 203 may transmit downlink data to each of the wireless terminals UE1, UE2, and UE4 using the assigned sub-subframes over a downlink shared channel(s) (e.g., using PDSCH) at block 607 and receive ACK/NACK feedback at block 609 until subframe n+1 is complete at block 611. While not explicitly shown in FIG. 6, ACK/NACK feedback for subframe n+1 may be received after completion of subframe n+1.

As shown in subframe n+1 of FIG. 5, the TDS indication for wireless terminal UE1 assigns four 2 symbol subframes (identified as PDSCH1, PDSCH2, PDSCH3, and PDSCH4) for downlink transmission of data using the second frequency resource. At block 607, processor 203 transmits the downlink data through transceiver 201 using the assigned sub-subframes, and at block 609, processor 203 may receive separate ACK/NACK feedback from wireless terminal UE1 for data of each assigned sub-subframe. Because each of the sub-subframes assigned to wireless terminal UE1 are transmitted sequentially, wireless terminal UE1 may respond with sequential ACK/NACK feedback, with ACK/NACK feedback for the first sub-subframe being provided before ACK/NACK feedback for the second sub-subframe, with ACK/NACK feedback for the second sub-subframe being provided before ACK/NACK feedback for the third sub-subframe, and with ACK/NACK feedback for the third sub-subframe being provided before ACK/NACK feedback for the fourth sub-subframe. Accordingly, ACK/NACK feedback for the four sub-subframes may be provided concurrently.

As shown in subframe n of FIG. 5, the TDS indication for wireless terminal UE2 assigns two 2 symbol sub-subframes (identified as PDSCH1 and PDSCH2) for downlink transmission of data using the second frequency resource. At block 607, processor 203 transmits first downlink data through transceiver 201 using the first assigned sub-subframe using the second frequency resource, and processor 203 then transmits second downlink data through transceiver 201 using the second assigned sub-subframe also using the second frequency resource. At block 609, processor 203 may receive first ACK/NACK feedback from wireless terminal UE2 for the first data transmitted during the first assigned sub-subframe, and processor 203 may receive second ACK/NACK feedback from wireless terminal UE2 for the second data transmitted during the second assigned sub-subframe. Because the first sub-frame precedes the second sub-subframe, ACK/NACK feedback for the first sub-subframe may precede ACK/NACK data for the second sub-subframe.

As shown in subframe n of FIG. 5, the TDS indication for wireless terminal UE4 assigns three four symbol sub-subframes (identified as PDSCH1, PDSCH2, and PDSCH3) for downlink transmission of data on the third frequency resource. At block 607, processor 203 transmits first downlink data through transceiver 201 using the first assigned sub-subframe, processor 203 transmits second downlink data through transceiver 20 using the second assigned sub-subframe, and processor 203 transmits third downlink data through transceiver 201 using the third assigned sub-subframe. At block 609, processor 203 may receive separate ACK/NACK feedback from wireless terminal UE4 for the data transmitted during the assigned sub-subframes.

Operations of wireless terminals UEs will now be discussed with respect to the TDS/NDI indicators of Table 4, the scheduling examples of FIG. 5, and the flow chart of FIG. 7. More particularly, the following discussion of operations of wireless terminals UE1, UE2, UE3, and UE4 will be provided in the context of the base station operations, scheduling assignments, and downlink transmissions discussed above with respect to the flow chart of FIG. 6.

As discussed above with respect to FIG. 6, base station BS-1 may transmit downlink control information to wireless terminals UE1, UE2, UE3, and UE4 at the beginning of subframe n, and base station BS-1 may transmit downlink control information to wireless terminals UE1, UE2, and UE4 at the beginning of subframe n+1. Operations of wireless terminals UE1, UE2, UE3, and UE4 will be discussed separately below, Regarding wireless terminal UE1, wireless terminal UE1 processor 303 may receive downlink control information for subframe n through transceiver 301 at blocks 701 and 703. Using the TDS indications of Table 4 by way of example, wireless terminal UE1 may receive the first entry of Table 4 (TDS=000000, NDI=x00000) for DCI for subframe n, designating downlink transmission over the full subframe (less symbols used to transmit DCI using PDCCH) using first frequency resource. At block 705, UE1 processor 303 may receive downlink data through transceiver 301 during the assigned symbols of subframe n over the first frequency resource, and at block 707, UE1 processor 303 may transmit ACK/NACK feedback for the downlink data through transceiver 301 to base station BS-1. The ACK/NACK feedback may be transmitted by UE1 after completion of subframe n.

After completion of subframe n at block 709, wireless terminal UE1 may receive downlink control information for subframe n+1 through transceiver 301 at blocks 701 and 703. Using the TDS indications of Table 4, wireless terminal UE1 may receive the 13$^{th}$ entry of Table 4 (TDS=111100, NDI=xxxx00) for DCI for subframe n+1 designating downlink transmission over four 2 symbol sub-subframes using the second frequency resource, At block 705, UE1 processor 303 may receive downlink data through transceiver 301 during the assigned 2 symbol sub-subframes of subframe n+1 over the second frequency resource, and at block 707, UE1 processor 303 may transmit separate ACK/NACK feedback for each sub-subframe through transceiver 301 to base station BS-1. With sequential sub-subframes assigned to UE1 during sub-subframe n+1, wireless terminal UE1 may separately transmit each ACK/NACK feedback upon completion of the respective sub-subframe to reduce ACK/NACK round trip times RTT (for data of the earlier sub-subframes).

Regarding wireless terminal UE2, wireless terminal UE2 processor 303 may receive downlink control information for subframe n through transceiver 301 at blocks 701 and 703. Using the TDS indications of Table 4 by way of example, wireless terminal UE2 may receive the 24$^{th}$ entry of Table 4 (TDS=110000, NDI=xx1000) for DCI for subframe n, designating downlink transmission over two sub-subframes using the second frequency resource. At block 705, UE2 processor 303 may receive downlink data through transceiver 301 during the assigned sub-subframes of subframe n over the second frequency resource, and at block 707, UE2 processor 303 may transmit separate ACK/NACK feedback for the downlink data of the respective sub-subframes through transceiver 301 to base station BS-1. With sequential sub-subframes assigned to UE2 during subframe n, wireless terminal UE2 may transmit ACK/NACK feedback for the first sub-subframe before transmitting ACK/NACK feedback for the second sub-subframe to reduce ACK/NACK RTT for the first sub-subframe. The ACK/NACK feedback for the first and second sub-subframes may be transmitted after completion of subframe n.

After completion of subframe n at block 709, wireless terminal UE2 may receive downlink control information for subframe n+1 through transceiver 301 at blocks 701 and 703. Using the TDS indications of Table 4, wireless terminal UE1 may receive the 10$^{th}$ entry of Table 4 (TDS=000011, NDI=0000xx) for DCI for subframe n+1 designating downlink transmission over two 2 symbol sub-subframes using the second frequency resource. At block 705, UE2 processor 303 may receive downlink data through transceiver 301 during the assigned 2 symbol sub-subframes of subframe n+1 over the second frequency resource, and at block 707, UE2 processor 303 may transmit separate ACK/NACK feedback for each sub-subframe through transceiver 301 to base station BS-1. With sequential sub-subframes assigned to UE2 during sub-subframe n+1, wireless terminal UE2 may separately transmit each ACK/NACK feedback upon completion of the respective sub-subframe to reduce ACK/NACK round trip times RTT (for the earlier sub-subframes)

Regarding wireless terminal UE3, wireless terminal UE3 processor 303 may receive downlink control information for subframe n through transceiver 301 at blocks 701 and 703. Using the TDS indications of Table 4 by way of example, wireless terminal UE3 may receive the 22$^{nd}$ entry of Table 4 (TDS=100000, NDI=x01000) for DCI for subframe n, designating downlink data transmission over sub-subframe e.g., the first seven symbols less symbols used for PDCCH) using the third frequency resource. At block 705, UE3 processor 303 may receive downlink data through transceiver 301 during the assigned sub-subframe of subframe n over the third frequency resource, and at block 707, UE3 processor 303 may transmit ACK/NACK feedback for the downlink data through transceiver 301 to base station BS-1.

After completion of subframe n at block 709, wireless terminal UE3 may wait at block 701 until new DCI for a new subframe is received from base station BS-1. Because downlink data is not scheduled for wireless terminal UE3 during subframe n+1, no DCI for subframe n+1 is received by wireless terminal UE3.

Regarding wireless terminal UE4, wireless terminal UE4 processor 303 may receive downlink control information for subframe n through transceiver 301 at blocks 701 and 703. Using the TDS indications of Table 4 by way of example, wireless terminal UE4 may receive the 23$^{nd}$ entry of Table 4 (TDS=010000, NDI=0x1000) for DCI for subframe n, designating downlink transmission over one sub-subframe using the third frequency resource. At block 705, UE4 processor 303 may receive downlink data through transceiver 301 during the assigned sub-subframe of subframe n over the third frequency resource, and at block 707, UE4 processor 303 may transmit ACK/NACK feedback for the downlink data of the assigned sub-subframe through transceiver 301 to base station BS-1. The ACK/NACK feedback for the assigned sub-subframe may be transmitted after completion of subframe n.

After completion of subframe n at block 709, wireless terminal UE4 may receive downlink control information for subframe 301 through transceiver 301 at blocks 701 and 703. Using the TDS indications of Table 4, wireless terminal UE1 may receive the 21$^{st}$ entry of Table 4 (TDS=111.000, NDI=xxx100) for DCI for subframe n+1 designating downlink transmission over three 4 symbol sub-subframes using the third frequency resource. At block 705, UE4 processor 303 may receive downlink data through transceiver 301 during the assigned 4 symbol sub-subframes of subframe n+1 over the third frequency resource, and at block 707, UE4 processor 303 may transmit separate ACK/NACK feedback for each sub-subframe through transceiver 301 to base station BS-1. With sequential sub-subframes assigned to UE4 during sub-subframe n+1, wireless terminal UE4 may separately transmit each ACK/NACK feedback upon completion of the respective sub-subframe to reduce ACK/NACK round trip times RTT (for the earlier sub-subframes).

ABBREVIATIONS

ACK Acknowledgement
ARQ Automatic Repeat reQuest
C-RNTI Cell Radio Network Temporary Identity
CRC Cyclic Redundancy Check
CP Cyclic Prefix
DL Downlink
DCI Downlink Control Information
DRX Discontinuous Reception
HARQ Hybrid Automatic Repeat reQuest
LTE Long Term Evolution
NDI New Data Indication
MCS Modulation and Coding Scheme
OFDM Orthogonal Frequency Division Multiple Access
PDCCH Physical Downlink Control Channel
PHICH Physical HARQ indication Channel
PUCCH Physical Uplink Control Channel
PUSCH Physical Uplink Shared Channel
PDB Physical Resource Block
RLC Radio Link Control
RRC Radio Resource Control
RAT Radio Access Technology
RA Resource Allocation
RBG Resource Block Group
RTT Round Trip Time
RV Redundancy Version
SC-FDMA Single Carrier-Frequency Division Multiple Access
SST Sub-SubFrame
TDD Time Domain Division
TDS Time Domain Split
TTI Transmission Time Interval Example Embodiments Embodiment 1. A method of operating a network node (BS) in a radio access network (RAN), the method comprising: transmitting (605) control information for a subframe from the network node to a wireless terminal, wherein the control information includes a Time Domain Split (TDS) indication defining a sub-subframe of the subframe, wherein a duration of the sub-subframe is less than a duration of the subframe; and providing (607) communication of data between the network node and the wireless terminal during the sub-subframe of the subframe.

Embodiment 2. The method of Embodiment 1, wherein the TDS indication is a first TDS indication, wherein the sub-subframe is a first sub-subframe of the subframe, wherein the data is first data, wherein the TDS indication defines a second sub-subframe of the subframe, and wherein a sum of the duration of the first sub-subframe and a duration of the second sub-subframe is less than the duration of the subframe; and providing (607) communication of second data between the network node and the wireless terminal during the second sub-subframe of the subframe.

Embodiment 3. The method of Embodiment 2 wherein the control information defines a same frequency resource for the first and second sub-subframes, wherein providing communication of the first data comprises providing communication of the first data using the frequency resource during the first sub-subframe of the sublimate, and wherein providing communication of the second data comprises providing communication of the second data using the frequency resource during the second sub-subframe of the subframe.

Embodiment 4. The method of any of Embodiments 2-3 wherein the first sub-subframe precedes the second sub-subframe, and wherein providing communication of the first data precedes providing communication of the second data.

Embodiment 5. The method of any of Embodiments 2-4 wherein transmitting the control information comprises transmitting the control information over a downlink control channel during the subframe, and wherein the control information is transmitted before providing communication of the first data and before providing communication of the second data, Embodiment 6. The method of any of Embodiments 2-5 wherein providing communication of the first data comprises transmitting the first data from the network node to the wireless terminal over a downlink shared channel of the subframe, and wherein providing communication of the second data comprises transmitting the second data from the network node to the wireless terminal over a downlink shared channel of the subframe.

Embodiment 7. The method of any of Embodiments 2-6 wherein the first sub-subframe precedes the second sub-subframe, the method further comprising: receiving (609) first ACK/NACK feedback from the wireless terminal for the first data of the first sub-subframe; and after receiving the first ACK/NACK feedback, receiving (609) second ACK/NACK feedback from the wireless terminal for the second data of the second sub-subframe.

Embodiment 8. The method of any of Embodiments 2-7 wherein the control information includes a first New Data Indicator (NDI) for the first sub-subframe and a second NM for the second sub-subframe.

Embodiment 9. The method of any of Embodiments 2-8 wherein the control information includes a first Redundancy Version (RV) for the first sub-subframe and a second RV for the second sub-subframe.

Embodiment 10. The method of any of Embodiments 2-9, wherein the control information is first control information, wherein the TDS indication is a first TDS indication, and wherein the wireless terminal is a first wireless terminal, the method further comprising: transmitting (605) second control information for the subframe from the network node to a second wireless terminal, wherein the second control information includes a second TDS indication defining a third sub-subframe of the subframe, wherein a sum of durations of the first, second, and third sub-sub-frames is less than the duration of the subframe; and providing (607) communication of third data between the network node and the second wireless terminal during the third sub-subframe of the subframe.

Embodiment 11. The method of Embodiment 10, wherein the first control information and the second control information define a same frequency resource for the first, second, and third sub-subframes, wherein providing communication of the first data, the second data, and the third data comprises providing communication of the first data, the second data, and the third data using the frequency resource, and wherein the first sub-subframe, the second sub-subframe, and the third sub-subframe are non-overlapping in time.

Embodiment 12. The method of any of Embodiments 2-9, wherein the control information comprises first control information, the method further comprising: transmitting (605) second control information for a second subframe from the network node to the wireless terminal, wherein the second control information includes a second TDS indication defining a sub-subframe of the second subframe, and wherein a duration of the sub-subframe of the second subframe is less than a duration of the second subframe; and providing (607) communication of data between the network node and the wireless terminal during the sub-subframe of the second subframe.

Embodiment 13. The method of Embodiment 1, wherein the control information is first information, wherein the TDS indication is a first TDS indication, wherein the wireless terminal is a first wireless terminal, wherein the sub-subframe is a first sub-subframe of the subframe, and wherein the data is first data, the method further comprising: transmitting (605) control information for the subframe from the network node to a second wireless terminal, wherein the second control information includes a second TDS indication defining a second sub-subframe of the subframe after the first sub-subframe, wherein a sum of the duration of the first sub-subframe and a duration of the second sub-subframe is less than the duration of the subframe; and providing (607) communication of second data between the network node and the second wireless terminal during the second sub-subframe of the subframe.

Embodiment 14. The method of Embodiment 13 wherein the first control information and the second control information define a same frequency resource for the first and second sub-subframes, wherein providing communication of the first data comprises providing communication of the first data using the frequency resource during the first sub-subframe of the subframe, and wherein providing communication of the second data comprises providing communication of the second data using the frequency resource during the second sub-subframe of the subframe.

Embodiment 15. The method of any of Embodiments 13-14 wherein the first sub-subframe precedes the second sub-subframe, and wherein providing communication of the first data precedes providing communication of the second data.

Embodiment 16. The method of any of Embodiments 13-15 wherein transmitting the first and second control information comprises transmitting the first and second control information over a downlink control channel during the subframe, and wherein the first and second control information is transmitted before providing communication of the first data and before providing communication of the second data.

Embodiment 17. The method of any of Embodiments 13-16 wherein providing communication of the first data comprises transmitting the first data from the network node to the first wireless terminal over a downlink shared channel of the subframe, and wherein providing communication of the second data comprises transmitting the second data from the network node to the second wireless terminal over a downlink shared channel of the subframe.

Embodiment 18. The method of Embodiment 1, wherein the control information comprises first control information, the method further comprising: transmitting (605) second control information for a second subframe from the network node to the wireless terminal over the wireless channel, wherein the second control information includes a second Time Domain Split indication defining a sub-subframe of the second subframe, and wherein a duration of the sub-subframe of the second subframe is less than a duration of the second subframe; and providing (607) communication of data between the network node and the wireless terminal during the sub-subframe of the second subframe.

Embodiment 19. The method of Embodiment 18 wherein the duration of the sub-subframe of the first subframe is different than a duration of the sub-subframe of the second subframe.

Embodiment 20. The method of any of Embodiments 18-19 wherein the durations of the first and second sub-frames are the same.

Embodiment 21. The method of any of Embodiments 18-20 wherein transmitting the first control information comprises transmitting the first control information over a downlink control channel during the first subframe before providing communication of the first data, and wherein transmitting the second control information comprises transmitting the second control information over a downlink control channel during the second subframe before providing communication of the second data.

Embodiment 22. The method of any of Embodiments 18-21 wherein providing communication of the first data comprises transmitting the first data from the network node to the wireless terminal over a downlink shared channel of the first subframe, and wherein providing communication of the second data comprises transmitting the second data from the network node to the wireless terminal over a downlink shared channel of the subframe.

Embodiment 23. The method of any of Embodiments 1-22 wherein the duration of the subframe is at least two times greater than the duration of the sub-subframe.

Embodiment 24. The method of Embodiment 23 wherein the subframe has a duration of no more than 14 symbols and the sub-subframe has a duration of no more than 7 symbols.

Embodiment 25. The method of any of Embodiments 23-24 wherein the subframe has a duration of no more than 1 millisecond and the sub-subframe has a duration of no more than ½ millisecond.

Embodiment 26. The method of any of Embodiments 1-22 wherein the duration of the subframe is at least three times greater than the duration of the sub-subframe.

Embodiment 27. The method of Embodiment 26 wherein the subframe has a duration of no more than 14 symbols and the sub-subframe has a duration of no more than 4 symbols.

Embodiment 28. The method of any of Embodiments 26-27 wherein the subframe has a duration of no more than 1 millisecond and the sub-subframe has a duration of no more than ⅓ millisecond.

Embodiment 29. The method of any of Embodiments 1-22 wherein the duration of the subframe is at least six times greater than the duration of the sub-subframe.

Embodiment 30. The method of Embodiment 29 wherein the subframe has adoration of no more than 14 symbols and the sub-subframe has a duration of no more than 2 symbols.

Embodiment 31. The method of any of Embodiments 29-30 wherein the subframe has a duration of no more than 1 millisecond and the sub-subframe has a duration of no more than ⅙ millisecond.

Embodiment 32. The method of any of Embodiments 1-31 wherein the network node comprises a network base station, wherein the control information comprises Downlink Control Information (DCI), and wherein providing communication of data comprises transmitting the data from the base station to the wireless terminal during the sub-subframe.

Embodiment 33. The method of any of Embodiments 1-32, wherein transmitting the control information comprises transmitting the control information over a downlink control channel during the subframe, and wherein providing communication of the data comprises transmitting the data from the network node to the wireless terminal over a downlink shared channel during the sub-subframe of the subframe after transmitting the control information.

Embodiment 34. A network node (BS) of a wireless communication network, the network node comprising: a communication interface (201) configured to provide communication with one or more wireless terminals over a radio interface; and a processor (203) coupled with the communication interface, wherein the processor is configured to perform operations of any of Embodiments 1-33.

Embodiment 35. A network node (BS) of a wireless communication network adapted to perform operations of any of Embodiments 1-33.

Embodiment 36. A method of operating a wireless terminal (UE) in communication with a radio access network (RAN), the method comprising: receiving (703) control information for a subframe from the network node, wherein the control information includes a Time Domain Split (TDS) indication defining a sub-subframe of the subframe, wherein a duration of the sub-subframe is less than a duration of the subframe; and providing (705) communication of data between the wireless terminal and the network node during the sub-subframe of the subframe.

Embodiment 37. The method of Embodiment 36, wherein the TDS indication is a first TDS indication, wherein the sub-subframe is a first sub-subframe of the subframe, wherein the data is first data, wherein the TDS indication defines a second sub-subframe of the subframe, and wherein a sum of the duration of the first sub-subframe and a duration of the second sub-subframe is less than the duration of the subframe; and providing (705) communication of second data between the wireless terminal and the network node during the second sub-subframe of the subframe.

Embodiment 38. The method of Embodiment 37 wherein the control information defines a same frequency resource for the first and second sub-subframes, wherein providing communication of the first data comprises providing communication of the first data using the frequency resource during the first sub-subframe of the subframe, and wherein providing communication of the second data comprises providing communication of the second data using the frequency resource during the second sub-subframe of the subframe.

Embodiment 39. The method of any of Embodiments 37-38 wherein the first sub-subframe precedes the second sub-subframe, and wherein providing communication of the first data precedes providing communication of the second data.

Embodiment 40. The method of any of Embodiments 37-39 wherein receiving the control information comprises receiving the control information over a downlink control channel during the subframe, and wherein the control information is received before providing communication of the first data and before providing communication of the second data.

Embodiment 41. The method of any of Embodiments 37-40 wherein providing communication of the first data comprises receiving the first data from the network node over a downlink shared channel of the subframe, and wherein providing communication of the second data comprises receiving the second data from the network node over a downlink shared channel of the subframe.

Embodiment 42. The method of any of Embodiments 37-41 wherein the first sub-subframe precedes the second sub-subframe, the method further comprising: transmitting (707) first ACK/NACK feedback for the first data of the first sub-subframe to the network node; and after transmitting the first ACK/NACK feedback, transmitting (707) second ACK/NACK feedback for the second data of the second sub-subframe to the network node.

Embodiment 43. The method of any of Embodiments 37-42 wherein the control information includes a first New Data Indicator (NDI) for the first sub-subframe and a second NDI for the second sub-subframe.

Embodiment 44. The method of any of Embodiments 37-43 wherein the control information includes a first Redundancy Version (RV) for the first sub-subframe and a second RV for the second sub-subframe.

Embodiment 45. The method of any of Embodiments 37-44, wherein the control information comprises first control information, the method further comprising: receiving (703) second control information for a second subframe from the network node, wherein the second control information includes a second TDS indication defining a sub-subframe of the second subframe, and wherein a duration of the sub-subframe of the second subframe is less than a duration of the second sub-frame; and providing (705) communication of data between the wireless terminal and the network node during the sub-subframe of the second subframe.

Embodiment 46. The method of Embodiment 36, wherein the control information comprises first control information, the method further comprising: receiving (703) second control information for a second subframe from the network node, wherein the second control information includes a second Time Domain Split indication defining a sub-subframe of the second subframe, and wherein a duration of the sub-subframe of the second subframe is less than a duration of the second subframe; and providing (705) communication of data between the wireless terminal and the network node during the sub-subframe of the second subframe.

Embodiment 47. The method of Embodiment 46 wherein the duration of the sub-subframe of the first subframe is different than a duration of the sub-subframe of the second subframe.

Embodiment 48. The method of any of Embodiments 46-47 wherein the durations of the first and second subframes are the same.

Embodiment 49. The method of any of Embodiments 46-48 wherein receiving the first control information comprises receiving the first control information over a downlink control channel during the first subframe before providing communication of the first data, and wherein receiving the second control information comprises receiving the second control information over a downlink control channel during the second subframe before providing communication of the second data.

Embodiment 50. The method of any of Embodiments 46-49 wherein providing communication of the first data comprises receiving the first data from the network node over a downlink shared channel of the first subframe, and wherein providing communication of the second data comprises receiving the second data from the network node over a downlink shared channel of the subframe.

Embodiment 51. The method of any of Embodiments 36-50 wherein the duration of the subframe is at least two times greater than the duration of the sub-subframe.

Embodiment 52. The method of Embodiment 51 wherein the subframe has a duration of no more than 14 symbols and the sub-subframe has a duration of no more than 7 symbols.

Embodiment 53. The method of any of Embodiments 51-52 wherein the subframe has a duration of no more than 1 millisecond and the sub-subframe has a duration of no more than ½ millisecond.

Embodiment 54. The method of any of Embodiments 36-50 wherein the duration of the subframe is at least three times greater than the duration of the sub-subframe.

Embodiment 55. The method of Embodiment 54 wherein the subframe has a duration of no more than 14 symbols and the sub-subframe has a duration of no more than 4 symbols.

Embodiment 56. The method of any of Embodiments 54-55 wherein the subframe has a duration of no more than 1 millisecond and the sub-subframe has a duration of no more than ⅓

Embodiment 57. The method of any of Embodiments 36-50 wherein the duration of the subframe is at least six times greater than the duration of the sub-subframe.

Embodiment 58. The method of Embodiment 57 wherein the subframe has a duration of no more than 14 symbols and the sub-subframe has a duration of no more than 2 symbols.

Embodiment 59. The method of any of Embodiments 57-58 wherein the subframe has a duration of no more than 1 millisecond and the sub-subframe has a duration of no more than 1/6 millisecond.

Embodiment 60. The method of any of Embodiments 36-59 wherein the network node comprises a network base station, wherein the control information comprises Downlink Control Information (DCI), and wherein providing communication of data comprises receiving the data from the base station during the sub-subframe.

Embodiment 61. The method of any of Embodiments 36-60, wherein receiving the control information comprises receiving the control information over a downlink control channel during the subframe, and wherein providing communication of the data comprises receiving the data from the network node over a downlink shared channel during the sub-subframe of the subframe after receiving the control information.

Embodiment 62. A wireless terminal comprising: a transceiver (301) configured to provide radio communication with a wireless communication network over a radio interface; and a processor (303) coupled with the transceiver, wherein the processor is configured to perform operations of any of Embodiments 36-61.

Embodiment 63. A wireless terminal adapted to perform operations of any of Embodiments 36-61.

Embodiment 64. The method of any of Embodiments 1 and 23-33, wherein the wireless terminal is a first wireless terminal, wherein the TDS indication is a first TDS indication, wherein the sub-subframe is a first sub-subframe of the sub-frame, wherein the communication of data is provided using a first frequency resource, and wherein the data is first data, the method further comprising: transmitting control information for the sublimate from the network node to a second wireless terminal, wherein the control information includes a TDS indication defining a second sub-subframe of the subframe; and providing communication of second data between the network node and the second wireless terminal during the second sub-subframe of the subframe.

Embodiment 65. The method of Embodiment 64, wherein communication of the first data is provided using a first frequency resource, and wherein communication of the second data is provided using a second frequency resource different than the first frequency resource.

Embodiment 66. The method of any of Embodiments 64-65, wherein portions of the first and second sub-subframes occur at the same time.

Further Definitions:

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described, in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exemplify gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read--only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows. Many different embodiments have been disclosed herein, in connection with the above description and the drawings. It will be understood that it would be unduly repetitious and obfuscating to literally describe and illustrate every combination and subcombinations of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

The invention claimed is:

1. A method of operating a network node in a radio access network (RAN), the method comprising:
   transmitting, to a wireless terminal, first control information including:
      a first Time Domain Split (TDS) indication that identifies a first sub-subframe comprising a first plurality of time-domain symbols of a first subframe, wherein the first sub-subframe duration is less than the first subframe duration; and
      a first indication of a frequency resource to be used during the first sub-subframe, wherein the first indication of the frequency resource is separate from the first TDS indication; and
   communicating first data between the network node and the wireless terminal based on the first TDS indication and the separate first indication of the frequency resource;
   wherein the first TDS indication identifies a second sub-subframe of the first subframe, and wherein a sum of the first sub-subframe duration and the second sub-subframe duration is less than the first subframe duration; and
   communicating second data between the network node and the wireless terminal during the second sub-subframe based on the first TDS indication; and
   wherein the separate first indication of the frequency resource comprises an indication that the frequency resource is for use during the second sub-subframe, and wherein communicating the second data is further based on the indication that the frequency resource is for use during the second sub-subframe.

2. The method of claim 1, wherein the first sub-subframe precedes the second sub-subframe, and wherein communicating the first data precedes communicating the second data.

3. The method of claim 1, wherein the first control information is transmitted over a downlink control channel during the first subframe, and wherein the first control information is transmitted before communicating the first data and before communicating the second data.

4. The method of claim 1, further comprising:
   transmitting second control information F or a second subframe from the network node to the wireless terminal wherein the second control information includes: a second TDS indication that identifies a further sub-subframe comprising a second plurality of time-domain symbols of the second subframe, and
   wherein a duration of the further sub-subframe of the second subframe is less than the second subframe duration; and
   a second indication of a frequency resource to he used during the further sub-subframe, wherein the second indication of the frequency resource is separate from the second TDS indication; and communicating second data between the network node and the wireless terminal based on the second TDS indication and the separate second indication of the frequency resource.

5. The method of claim 1, further comprising:
transmitting, to a second wireless terminal, second control information including:
a second TDS indication that identifies a second sub-subframe comprising a second plurality of time-domain symbols of the first subframe after the first sub-subframe, wherein a sum of the first sub-subframe duration and a the second sub-subframe duration is less than the first subframe duration; and
a second indication of a frequency resource to be used during the second sub-subframe, wherein the second indication of the frequency resource is separate from the second TDS indication; and
communicating second data between the network node and the second wireless terminal based on the second TDS indication and the separate second indication of the frequency resource.

6. The method of claim 5, wherein the first indication and the second indication identify same frequency resource to be used during the first and second sub-subframes.

7. The method of claim 5, wherein the first sub-subframe precedes the second sub-subframe, and wherein communicating the first data precedes communicating the second data.

8. A method of operating a network node in a radio access network (RAN), the method comprising:
transmitting, to a wireless terminal, first control information including:
a first Time Domain Split (TDS) indication that identifies a first sub-subframe comprising a first plurality of time-domain symbols of a first subframe, wherein the first sub-subframe duration is less than the first subframe duration; and
a first indication of a frequency resource to be used during the first sub-subframe, wherein the first indication of the frequency resource is separate from the first TDS indication;
communicating first data between the network node and the wireless terminal based on the first TDS indication and the separate first indication of the frequency resource;
transmitting, to a second wireless terminal, second control information including:
a second TDS indication that identifies a second sub-subframe comprising a second plurality of time-domain symbols of the first subframe after the first sub-subframe, wherein a sum of the first sub-subframe duration and a the second sub-subframe duration is less than the first subframe duration; and
a second indication of a frequency resource to be used during the second sub-subframe, wherein the second indication of the frequency resource is separate from the second TDS indication; and
communicating second data between the network node and the second wireless terminal based on the second TDS indication and the separate second indication of the frequency resource;
wherein the first and second control information is transmitted over a downlink control channel during the first subframe, and
wherein the first and second control information is transmitted before communicating the first data and before communicating the second data.

9. The method of claim 5, wherein communicating the first data comprises transmitting the first data from the network node to the first wireless terminal over a downlink shared channel of the first subframe, and wherein communicating the second data comprises transmitting the second data from the network node to the second wireless terminal over a downlink shared channel of the first subframe.

10. The method of claim 1, further comprising:
transmitting second control information for a second subframe from the network node to the wireless terminal over a wireless channel, wherein the second control information includes:
a second TDS indication defining a further sub-subframe comprising a second plurality of time-domain symbols of the second subframe, and wherein a duration of the further sub-subframe of the second subframe is less than the second subframe duration: and
a second indication of a frequency resource to be used during the further sub-subframe, wherein the second indication of the frequency resource is separate from the second TDS indication; and
communicating second data between the network node and the wireless terminal based on the second TDS indication and the separate second indication of the frequency resource.

11. The method of claim 10, wherein the duration of the first sub-subframe of the first subframe is different than a duration of the further sub-subframe of the second subframe.

12. The method of claim 10, wherein the first and second subframes durations are the same.

13. The method of claim 10, wherein the first control information is transmitted over a downlink control channel during the first subframe before communicating the first data, and wherein the second control information is transmitted over a downlink control channel during the second subframe before communicating the second data.

14. The method of claim 10, wherein communicating the first data comprises transmitting the first data from the network node to the wireless terminal over a downlink shared channel of the first subframe, and wherein communicating the second data comprises transmitting the second data from the network node to the wireless terminal over a downlink shared channel of the second subframe.

15. The method of claim 1, further comprising:
transmitting, to a second wireless terminal, second control information including:
a second TDS indication that identifies a second sub-subframe comprising a second plurality of time-domain symbols of the first subframe; and
a second indication of a frequency resource to be used during the second sub-subframe, wherein the second indication of the frequency resource is separate from the second TDS indication; and
communicating second data between the network node and the second wireless terminal based on the second TDS indication and the separate second indication of the frequency resource.

16. A method of operating a wireless terminal in communication with a radio access network, RAN, the method comprising:
receiving, from a network node, first control information including:
a first Time Domain Split (TDS) indication that identifies a first sub-subframe comprising a first plurality of time-domain symbols of a first subframe, wherein the first sub-subframe duration is less than the first subframe duration; and a first indication of a frequency resource to be used during the first sub-subframe, wherein the first indication of the frequency resource is separate from the first TDS indication; and communicating first data between the wireless terminal and the network node based on the first TDS indication and the separate first indication of the frequency resource;

wherein the first TDS indication identifies a second sub-subframe of the first subframe, and wherein a sum of the first sub-subframe duration and the second sub-subframe duration is less than the first subframe duration; and further comprising:

communicating second data between the wireless terminal and the network node during the second sub-subframe based on the first TDS indication; and wherein the separate first indication of the frequency resource comprises an indication that the frequency resource is for use during the second sub-subframes, and wherein communicating the second data is further based on the indication that the frequency resource is for use during the second sub-subframe.

17. The method of claim 16, wherein the first sub-subframe precedes the second sub-subframe, and wherein communicating the first data precedes communicating the second data.

18. The method of claim 16, wherein the first control information is received over a downlink control channel during the first subframe, and wherein the first control information is received before communicating the first data and before communicating the second data.

19. The method of claim 16, further comprising:
receiving second control information for a second subframe from the network node, wherein the second control information includes:
a second TDS indication that identifies a further sub-subframe comprising a second plurality of time-domain symbols of the second subframe, and
wherein a duration of the further sub-subframe of the second subframe is less than the second subframe duration; and
a second indication of a frequency resource to be used during the further sub-subframe, wherein the second indication of the frequency resource is separate from the second TDS indication; and
communicating second data between the wireless terminal and the network node based on the second TDS indication and the separate second indication of the frequency resource.

20. The method of claim 16, further comprising:
receiving second control information for a second subframe from the network node, wherein the second control information includes:
a second TDS indication that identifies a further sub-subframe comprising a second plurality of time-domain symbols of the second subframe, and
wherein a duration of the Further sub-subframe of the second subframe is less than the second subframe duration; and
a second indication of a frequency resource to be used during the second subframe, wherein the second indication of the frequency resource is separate from the second TDS indication communicating second data between the wireless terminal and the network node based on the second TDS indication and the separate second indication of the frequency resource.

21. The method of claim 20, wherein the duration of the first sub-subframe of the first subframe is different than a duration of the further sub-subframe of the second subframe.

22. The method of claim 20, wherein the first and second subframes durations are the same.

23. The method of claim 20, wherein the first control information is received over a downlink control channel during the first subframe before communicating the first data, and wherein the second control information is received over a downlink control channel during the second subframe before communicating the second data.

24. The method of claim 20, wherein communicating the first data comprises receiving the first data from the network node over a downlink shared channel of the first subframe, and wherein communicating the second data comprises receiving the second data from the network node over a downlink shared channel of the second subframe.

* * * * *